United States Patent [19]
Kondo

[11] Patent Number: 5,546,305
[45] Date of Patent: Aug. 13, 1996

[54] MOTOR VEHICLE DRIVING ANALYTICALLY DIAGNOSING METHOD AND DEVICE

[76] Inventor: Shigeru Kondo, Niizuru-danchi, 1-16-204, Minami-machi 2-chome, Tsurugashima-shi, Saitama-ken 350-02, Japan

[21] Appl. No.: 267,264

[22] Filed: Jun. 15, 1994

Related U.S. Application Data

[63] Continuation of Ser. No. 958,055, Oct. 7, 1992, abandoned.

[30] Foreign Application Priority Data

Nov. 11, 1991 [JP] Japan ................................. 3-294610

[51] Int. Cl.$^6$ ................................................. B60K 31/00
[52] U.S. Cl. ................................. 364/424.03; 340/439
[58] Field of Search ...................... 364/424.01, 424.03, 364/424.04, 426.01, 578; 340/439

[56] References Cited

U.S. PATENT DOCUMENTS

| | | | |
|---|---|---|---|
| 3,310,662 | 3/1967 | Greenshields | 235/92 |
| 3,504,337 | 3/1970 | Ekman | 340/53 |
| 4,080,654 | 3/1978 | Walley, Jr. | 364/426 |
| 4,093,939 | 6/1978 | Mitchell | 340/52 F |
| 4,258,421 | 3/1981 | Juhasz et al. | 364/424 |
| 4,293,844 | 10/1981 | Ruhl | 340/52 R |
| 4,308,452 | 12/1981 | Henderson | 235/92 A E |
| 4,345,238 | 8/1982 | Weir | 340/52 F |
| 4,500,868 | 2/1985 | Tokitsu | 340/52 F |
| 4,533,962 | 8/1985 | Decker et al. | 360/5 |
| 4,623,870 | 11/1986 | Irimajiri et al. | 340/52 F |
| 4,627,011 | 12/1986 | Spencer et al. | 364/566 |
| 4,671,111 | 6/1987 | Lemelson | 73/432.1 |
| 4,763,745 | 8/1988 | Eto et al. | 180/143 |
| 5,074,144 | 12/1991 | Krofchalk et al. | 73/117.3 |
| 5,182,710 | 1/1993 | Tomisawa | 364/424.1 |

FOREIGN PATENT DOCUMENTS 8703720  6/1987  WIPO.

*Primary Examiner*—Kevin J. Teska
*Assistant Examiner*—Stephen J. Walder, Jr.
*Attorney, Agent, or Firm*—Dickstein, Shapiro & Morin, L.L.P.

[57] ABSTRACT

A motor vehicle driving analytically diagnosing device comprises: running speed detecting means for detecting a running speed of a motor vehicle; acceleration detecting means for detecting acceleration of the motor vehicle; braking detecting means for detecting braking of the motor vehicle; a detected signals analyzing unit for analyzing a running speed signal detected by the running speed detecting means, an acceleration signal detected by the acceleration detecting means and a braking signal detected by the braking detecting means to generate analyzed signals indicative of driving states of a driver; a dangerous driving times counting unit for counting dangerous driving times during which the analyzed signals generated by the detected signals analyzing unit satisfy predetermined danger judging conditions in a certain period of driving, and for detecting maximum values of the analyzed signals generated by the detected signals analyzing unit in the certain period of driving; and a driving diagnosing unit for diagnosing driving of a driver, based on ratios of the periods of dangerous driving to the certain period of driving time and the maximum values of the analyzed signals. Driving states of a motor vehicle can be accurately provided in detail, and driving patterns of the driver can be analytically diagnosed accurately.

24 Claims, 11 Drawing Sheets

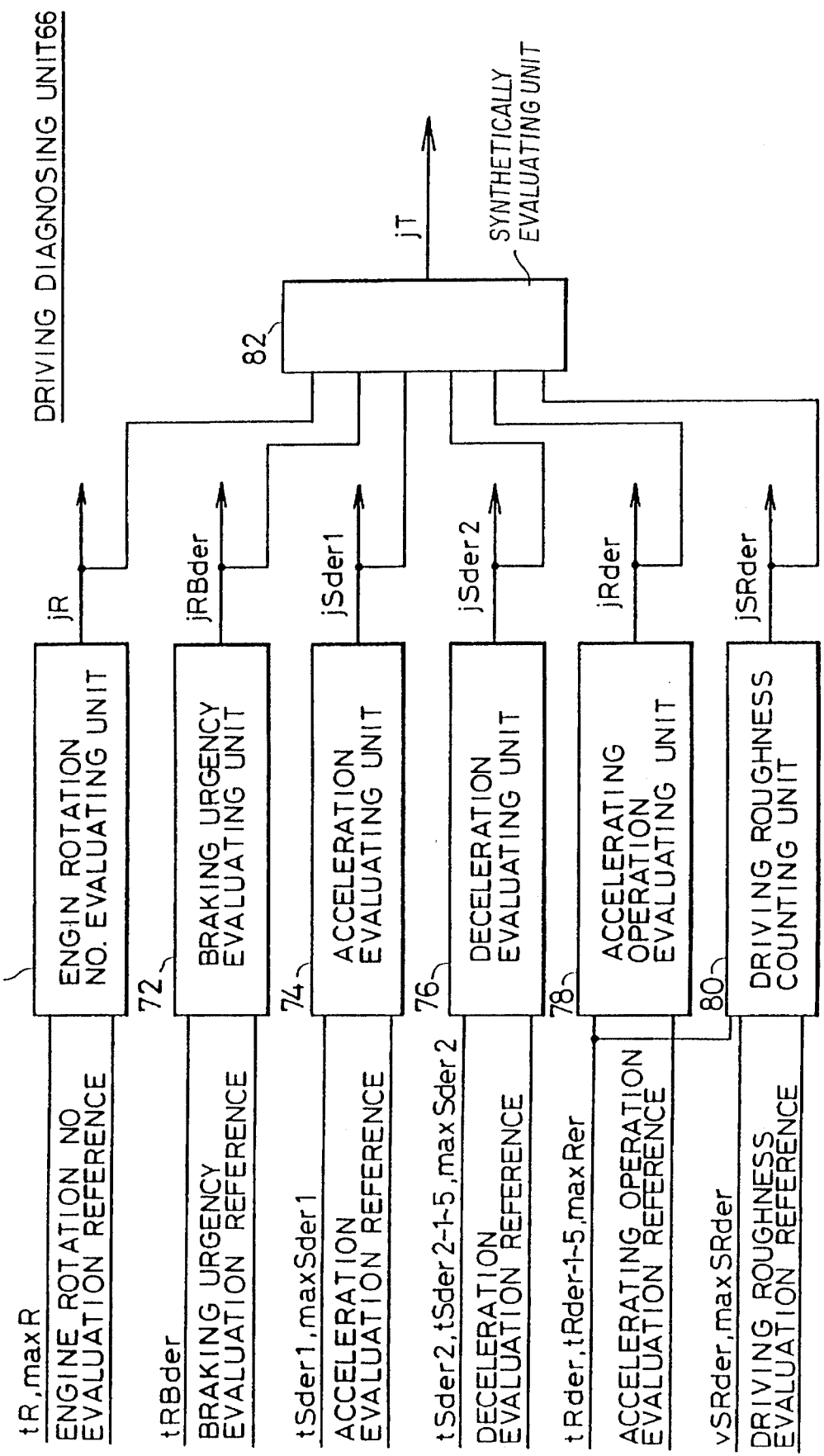

MOTOR VEHICLE DRIVING ANALYTICALLY DIAGNOSING METHOD AND DEVICE

This application is a continuation of application Ser. No. 07/958,055, filed Oct. 7, 1992, now abandoned.

BACKGROUND OF THE INVENTION

The present invention relates to a motor vehicle driving analytically diagnosing method and device for analyzing driving states of a driver of a motor vehicle and diagnosing his driving.

Recently motor vehicle accidents are on increase, and it is not too much to say that the extermination of motor vehicle accidents is a most important objective which has been assigned to us, human beings, in this century. There is a discussion that "Full Automatic Steering Drive" by an artificial intelligence should be realized, but it is not realizable with the technology of the present level. Then, to drastically decrease motor vehicle accidents on a realizable level, it is very important to improve the safe driving abilities of individual drivers.

The inventor of the present application thinks it very important to accurately recognize driving states of an individual driver so as to detect dangerous driving states which may lead to accidents and to feedback the driver the dangerous driving states. As means for recording driving states of a driver, tachometers are conventionally used for automatically recording instantaneous speeds, drive distances and drive hours.

But tachometers can provide data of only instantaneous speeds of motor vehicles, their drive distances and drive hours. Based on the recordings of the tachometers, driving states of motor vehicles cannot be recognized in detail, and it is impossible to accurately analytically diagnose driving patterns of drivers.

SUMMARY OF THE INVENTION

An object of the present invention is to provide a motor vehicle driving analytically diagnosing method and device which can provide driving states of a motor vehicle in detail for accurate analytical diagnoses of driving patterns of a driver.

The above-described object is achieved by a motor vehicle driving analytically diagnosing method comprising the steps of detecting a running speed of a motor vehicle, acceleration thereof, and braking thereof; the step of analyzing a detected running speed signal, an acceleration signal and a braking signal and generating analyzed signals indicative of driving states of a driver; the step of counting dangerous driving times during which the analyzed signals satisfy predetermined danger judging conditions in a certain period of driving time; and the step of diagnosing driving of the driver, based on ratios of the dangerous driving times to the certain period of driving time.

The above-described object is achieved by a motor vehicle driving analytically diagnosing device comprising: running speed detecting means for detecting a running speed of a motor vehicle; acceleration detecting means for detecting acceleration of the motor vehicle; braking detecting means for detecting braking of the motor vehicle; a detected signals analyzing unit for analyzing a running speed signal detected by the running speed detecting means, an acceleration signal detected by the acceleration detecting means and a braking signal detected by the braking detecting means to generate analyzed signals indicative of driving states of a driver; dangerous driving times counting unit for counting times of dangerous driving during which the analyzed signals generated by the detected signals analyzing unit satisfy predetermined danger judging conditions in a certain period of driving; and a driving diagnosing unit for diagnosing driving of a driver, based on ratios of the periods of dangerous driving to the certain period of driving time.

According to the present invention, a running speed of a motor vehicle, an accelerating operation and a braking operation are detected; and a detected running speed signal, a detected accelerating operation signal and a detected braking signal are analyzed to generate an analyzed signal in a predetermined form, which is indicative of driving states of a driver; the analyzed signal counts in a predetermined period of driving time dangerous driving times during which the analyzed signal satisfies predetermined danger judging conditions in a predetermined period of driving time are counted, whereby a driving of a driver is diagnosed based on a ratio of the dangerous driving time to the predetermined period of driving time. Resultantly driving states of a motor vehicle can be accurately provided in detail, and driving patterns of the driver can be analytically diagnosed accurately.

BRIEF DESCRIPTION OF THE DRAWINGS

FIG. 10 is a block diagram showing in good detail the driving diagnosing unit of the motor vehicle driving analytically diagnosing device according to another embodiment of the present invention.

DETAILED DESCRIPTION OF THE INVENTION

Figure 1:
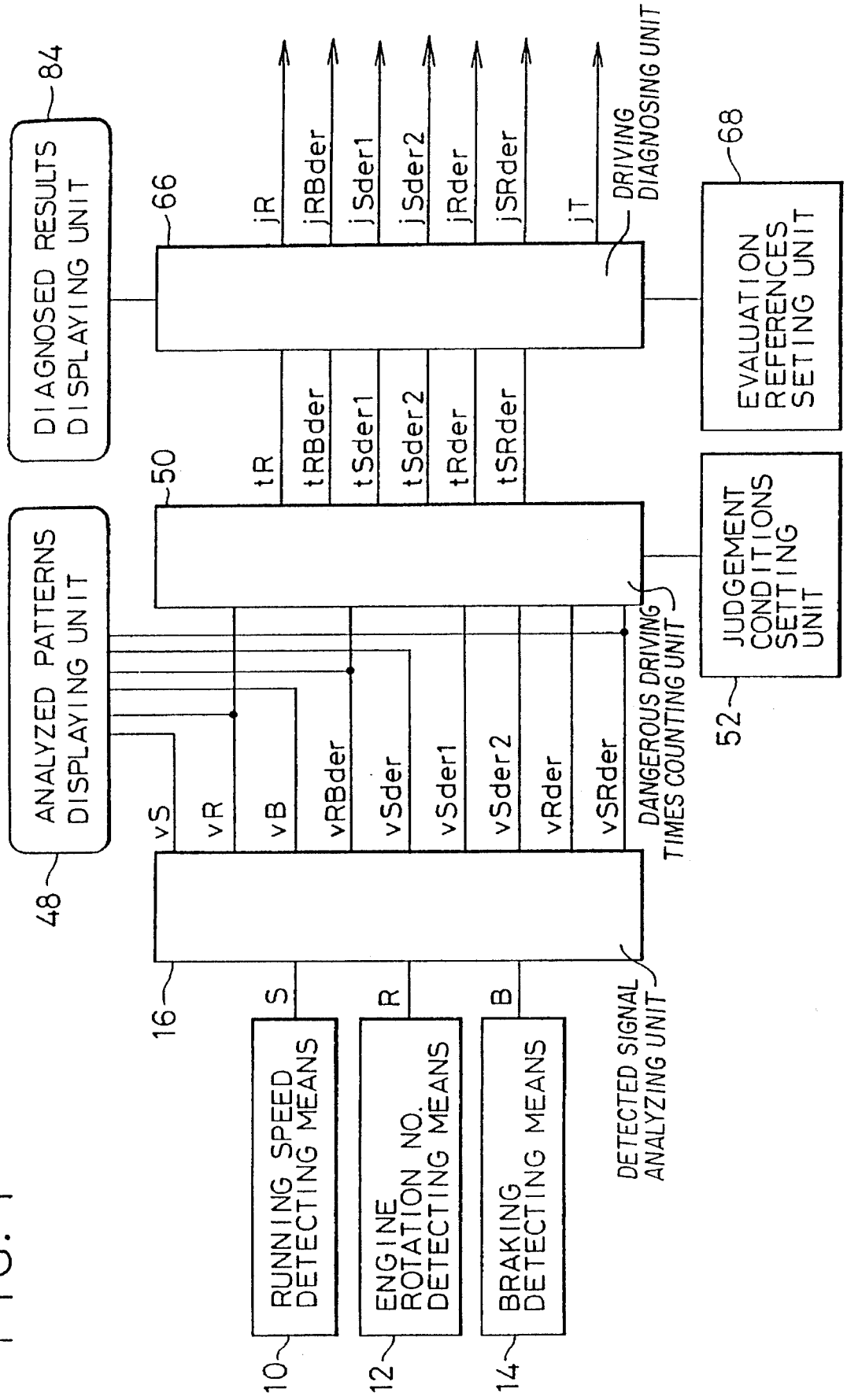
FIG. 1 is a block diagram of the motor vehicle driving analytically diagnosing device according to one embodiment of the present invention.
Figure 2:
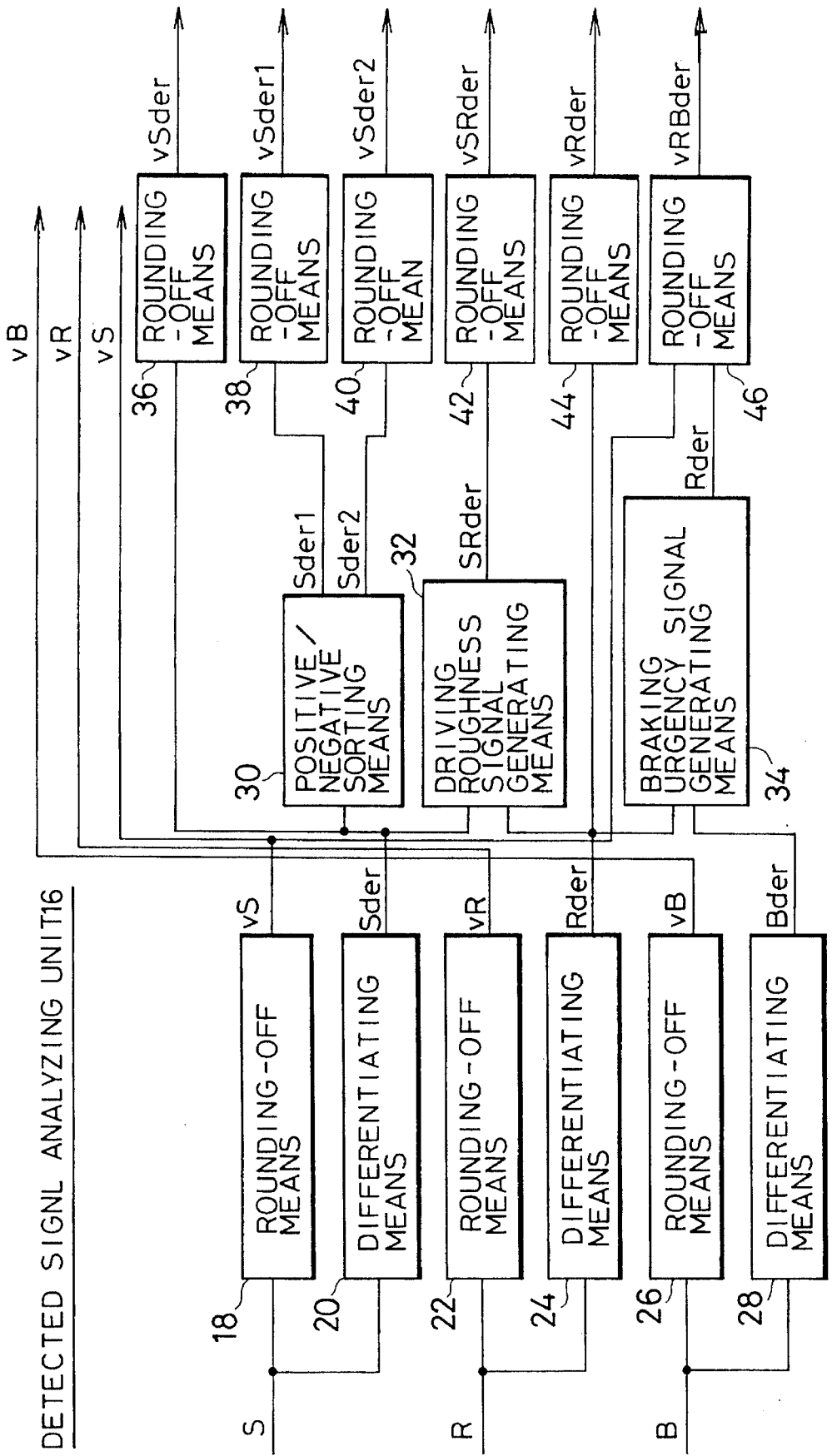
FIG. 2 is a block diagram showing in good detail the detected signal analyzing unit of the motor vehicle driving analytically diagnosing device according to the embodiment of FIG. 1.
Figure 3:
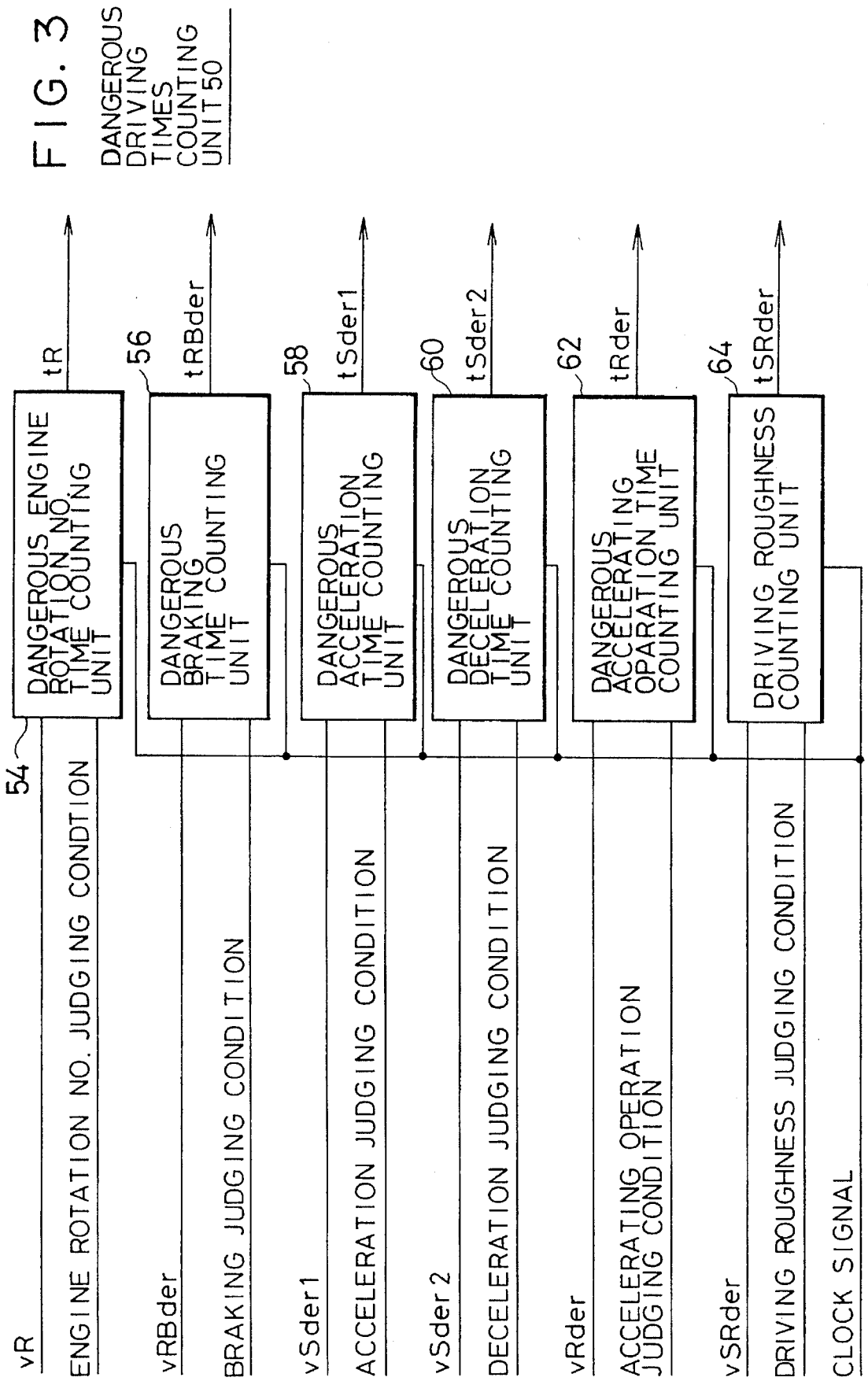
FIG. 3 is a block diagram showing in good detail the dangerous driving times counting unit of the motor vehicle driving analytically diagnosing device according to the embodiment of FIG. 1.
Figure 4:
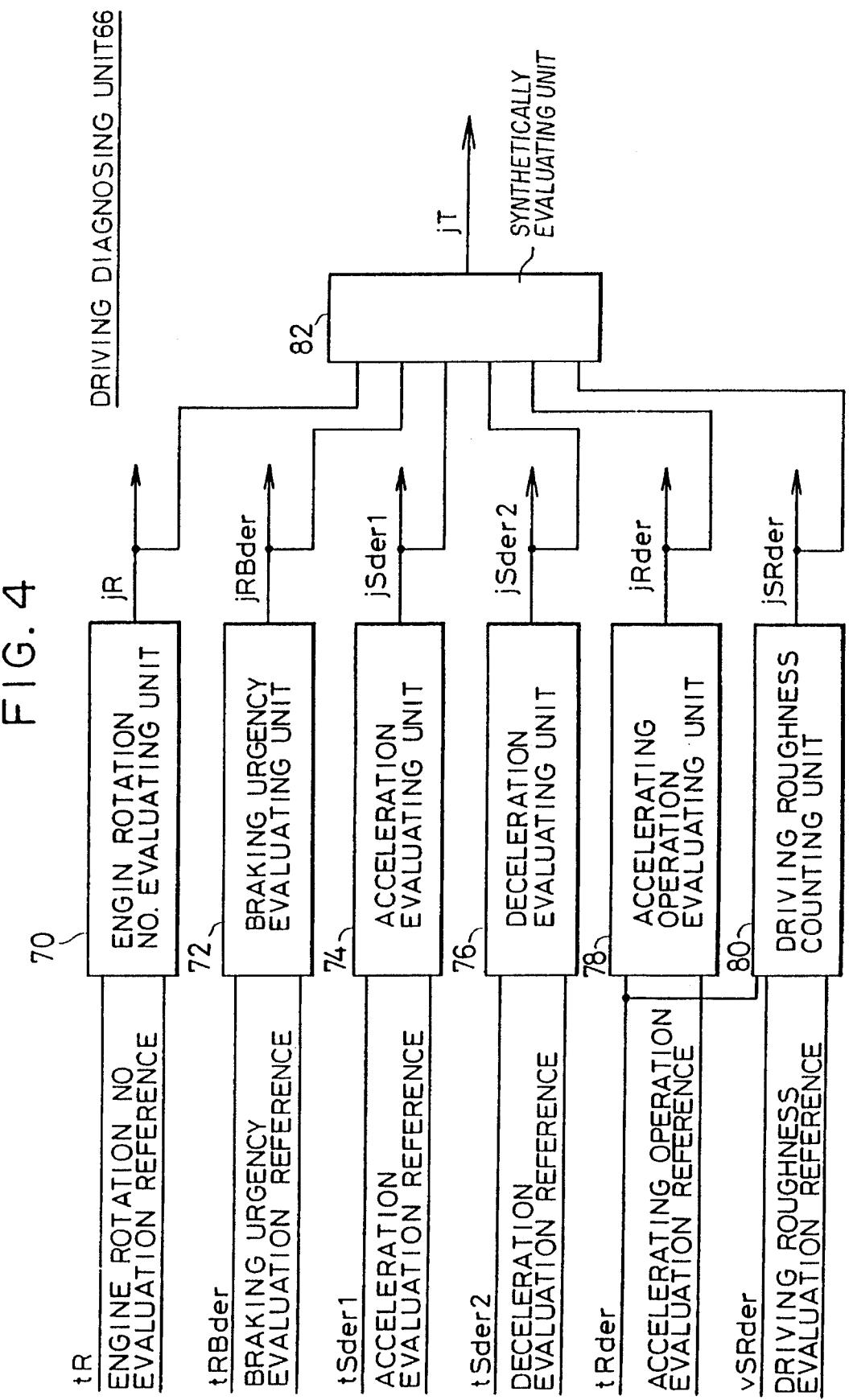
FIG. 4 is a block diagram showing in good detail the driving diagnosing unit of the motor vehicle driving analytically diagnosing device according to the embodiment of FIG. 1.

The motor vehicle driving analytically diagnosing device according to an embodiment of the present invention will be explained with reference to FIGS. 1 to 8. FIG. 1 schematically shows the motor vehicle drive analytically diagnosing device according to the embodiment, FIGS. 2 to 4 show in details the circuits of the constituent circuits of the device, and FIGS. 5 to 8 show display examples.

As shown in FIG. 1, in the motor vehicle drive analytically diagnosing device according to the present embodiment, three signals (a running speed signal S, an engine rotation number signal R and a braking signal B) are detected for the recognition of a driving state of a driver. Running speed detecting means 10 detects a running speed of a motor vehicle to output a running speed signal S. The engine rotation number signal R is detected for the recognition of an accelerating operation of a driver. Because an engine rotation number changes due to an operation of an accelerator, a differential value of the engine rotation number signal R indicates an accelerating operation. Braking detecting means 14 detects a braking operation to output a braking signal B.

A detected signals analyzing unit 16 analyzes a running speed signal S detected by the running speed detecting means 10, an engine rotation number signal R detected by the engine rotation number detecting means 12, a braking signal B detected by the braking detecting means 14 to generate a number of analyzed signals vS, vR, vB, vRBder, vSder, vSder1, vSder2, vRder, vSRder indicative of driving states of a driver.

The detected signals analyzing unit 16 will be explained in detail with reference to FIG. 2.

In the detected signals analyzing unit 16, first a running speed signal S, an engine rotation number signal R and a braking signal B are rounded off and differentiated. These signals are differentiated because changes with time are a significant factor in judging driving patterns of a driver.

A running speed signal S detected by the running speed detecting means 10 is rounded off by rounding-off means 18 for rounding off the value to a suitable place figure to be converted into a running speed signal vS (hereinafter "v" means rounded-off), and is outputted as an analyzed signal. The running speed signal S is differentiated by differentiating means 20 for the detection of a change with time to be converted into a differentiated running speed signal Sder (hereinafter "der" means differentiated).

An engine rotation number signal R detected by the engine rotation number detecting means 12 is rounded off by rounding-off means 22 for rounding off the value to a suitable place figure to be converted into an engine rotation number signal vR, and is outputted as an analyzed signal. The engine rotation number signal R is differentiated by differentiating means 24 to be converted into a differentiated engine rotation number signal Rder.

A braking signal B detected by the braking detecting means 14 is rounded off by rounding-off means 26 for rounding off the value to be converted into a braking signal vB, and is outputted as an analyzed signal. The braking signal B is differentiated by differentiating means 28 to be converted into a differentiated braking signal Bder.

The differentiated running speed signal Sder has a positive mark when a motor vehicle is accelerated, and when the motor vehicle is decelerated, it has a negative mark. Depending on the acceleration and the deceleration, it is necessary to judge whether or not a driving is a dangerous pattern on different judging conditions. To this end, positive/negative sorting means 30 separates positive and negative differentiated running speed signals Sder1, Sder2 from each other.

Based on the observation of driving of a number of drivers, the inventor of the present application has found in connection with the roughness of a driving of a motor vehicle and the stability of the driving that the roughness of a driving is low when a differentiated running speed signal Sder indicative of a change of a running speed signal S is small, and a differentiated engine rotation number Rder indicative of a change of an engine rotation number signal R is small (an accelerating operation is not abrupt). Reversely, when a differentiated running speed signal Sder is large, and a differentiated engine rotation number signal Rder is large, the driving is rough.

Driving roughness signal generating means 32 multiplies a differentiated running speed signal Sder with the differentiated engine rotation number signal Rder to generate a driving roughness signal SRder. This driving roughness signal SRder is an important analyzed signal.

It is known that generally one main factor for the occurrences of motor vehicle accidents is drivers' delays in anticipating dangers. A driver's delay in anticipating a danger cannot allow him to operate a brake. Based on the observation of driving of a number of drivers, the inventor of the present application has found in connection with the urgency of the braking operation that the urgency of a braking operation is low when a differentiated running speed signal Sder generated upon braking is small, which means the driving allows the driver for braking operations. Reversely, when a differentiated running speed signal Sder generated upon braking is large, the driving does not allow the driver for braking operations, which results in unanticipated braking operations without times for the anticipation of dangers, and the driving is very dangerous.

Braking urgency signal generating means 34 multiplies an absolute number of a differentiated braking operation signal Bder by a signal generated by multiplying the differentiated engine rotation number Rder by 31 1 and generates a braking urgency signal RBder indicative of the urgency of the braking operation. This braking urgency signal RBder is an important analyzed signal.

Rounding-off means 36 rounds off a value of a differentiated running speed signal Sder into a suitable place figure and generates a differentiated running speed signal vSder to output an analyzed signal.

Similarly rounding-off means 38, 40 respectively round off a value of a differentiated running speed signal Sder1 and a value of a negative differentiated running speed signal Sder2 into suitable place numbers and generate a positive differentiated running speed signal vsder1, and a negative differentiated running speed signal vSder2 to generate them as analyzed signals.

Rounding-off means 42 rounds off a value of a driving roughness signal SRder into a suitable place figure to generate a driving roughness signals vSRder, and outputs the same as an analyzed signal.

Rounding-off means 44 rounds off a value of a differentiated engine rotation number signal Rder into a suitable place number and generates a differentiated engine rotation number signal vRder to output the same as an analyzed signal.

Rounding-off means 46 rounds off a value of breaking urgency signal RBder into a suitable place number, while reducing to 0 a running speed signal vS which is smaller than 26 km/hour because if a motor vehicle is driven at a low speed as in a traffic jam, the driving is not dangerous even though a braking urgency signal RBder is large, whereby a braking urgency signal vRBder is generated and outputs the same as an analyzed signal.

Here the explanation is made with reference to FIG. 1. In the present embodiment, among the analyzed signals outputted by the detected signals analyzing unit 16, a running speed signal vS, an engine rotation number signal vR, a braking operation signal vB, a driving roughness signal vSRder, a braking urgency signal vRBder, and a differentiated running speed signal Sder are displayed by an analyzed patterns displaying unit 48. Examples of analyzed patterns displayed by the analyzed pattern display unit 48 are shown in FIGS. 5 and 6.

Figure 5:
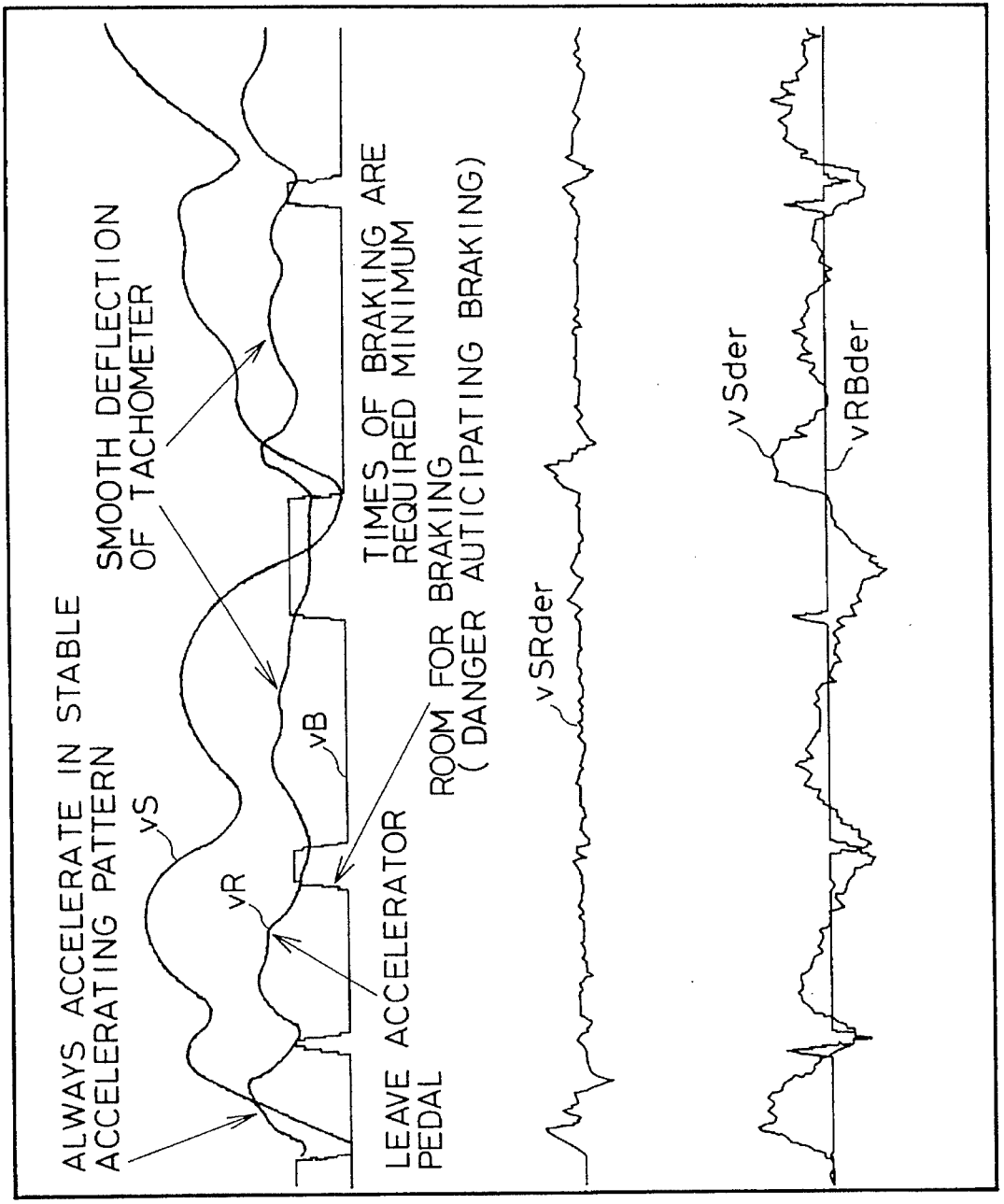
FIG. 5 is a view of one example of analyzed patterns displayed by the motor vehicle driving analytically diagnosing device of the embodiment of FIG. 1.
Figure 6:
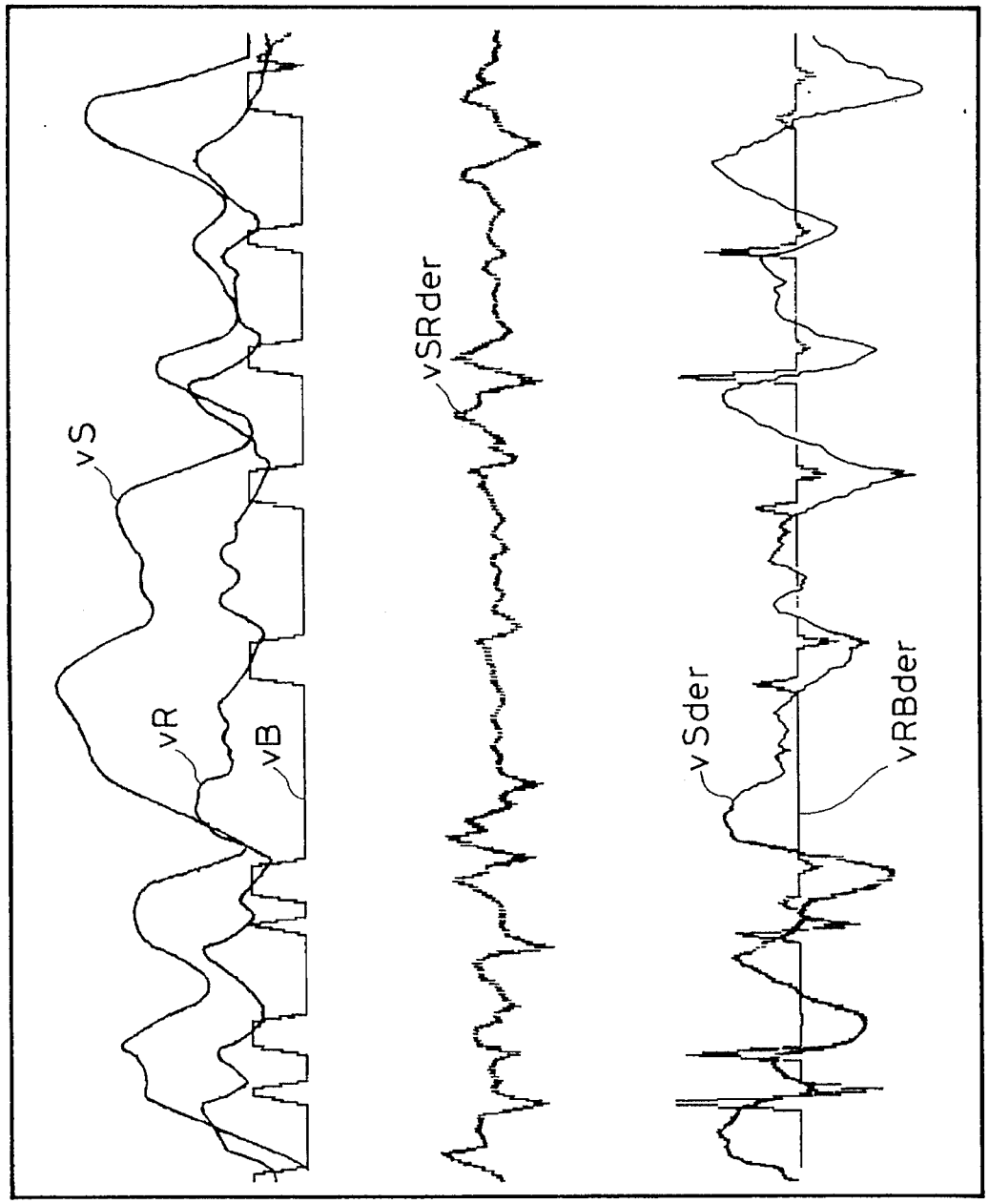
FIG. 6 is a view of another example of analyzed patterns displayed by the motor vehicle driving analytically diagnosing device of the embodiment of FIG. 1.

FIG. 5 shows driving patterns of safe driving by a safety driver. FIG. 6 shows driving patterns of rough driving by a rough driver. In FIGS. 5 and 6, although it is difficult to see differences between both driving, only based on the patterns of the running speed signals vS, the engine rotation number signals vR, the braking operation signals vB at the upper parts of FIGS. 5 and 6, the differences can be recognized at sight, based on the patterns of the driving roughness signals vSRder at the center, and the patterns of the braking urgency signals vRBder and the differentiated driving speed signals Sder.

By referring to analyzed patterns displayed on the analyzed pattern displaying unit 48 as described above, driving of a driver can be qualitatively diagnosed but cannot be quantitatively diagnosed. A dangerous driving time counting unit 50 is provided for quantitatively grasping analyzed signals from the detected signals analyzing unit 16. The dangerous driving times counting unit 50 counts, based on judgement references set in a judgement conditions setting unit 52 dangerous driving times of the driving speed signal vS, the engine rotation number signal vR, the braking urgency signal vRBder, the positive differentiated running speed signal Sder1, the negative differentiated running speed signal Sder2, the differentiated engine rotation number signal vRder, and the driving roughness signal vSRder in a period of driving time.

The dangerous driving times counting unit 50 will be explained in detail with reference to FIG. 3. In the present embodiment, a total driving time is divided in 975 units, and a dangerous driving time is counted in the units during the total driving time.

The present embodiment uses six judgement conditions for judging a driving state of a motor vehicle dangerous.

A driving state is judged dangerous when an engine rotation number exceeds a set rotation number. A dangerous engine rotation number driving time counting unit 54 counts in synchronization with clock signals a time during which an engine rotation number signal vR satisfies an engine rotation number judgement condition. In the present embodiment, a driving state is judged dangerous when an engine rotation number is larger than 2300 rpm. A counted value is outputted as an engine rotation number dangerous time tR (hereinafter "t" means a counted time value).

A driving state is judged dangerous when a braking urgency signal vRBder exceeds a set threshold value. A dangerous braking times counting unit 56 counts in synchronization with clock signals a time during which a braking urgency signal RBder satisfied a braking judgement condition. In the present embodiment, a driving state is judged dangerous when a braking urgency signal vRBer exceeds 35 level. A counted value is outputted as a dangerous braking time tRBder.

When acceleration of a motor vehicle is abrupt, the driving state is judged dangerous. A dangerous acceleration time counting unit 58 counts in synchronization with clock signals a time during which a positive differentiated running speed signal vSsder1 satisfies an acceleration judgement condition. In the present embodiment, a driving state is judged dangerous when a positive differentiated running speed signal vSder1 exceeds a set threshold value, e.g., 50 level. A counted value is outputted as a dangerous acceleration time tSder1.

When deceleration is abrupt, a driving state is judged dangerous. A dangerous deceleration time counting unit 60 count in synchronization with clock signals a time during which a negative differentiated running speed signal vSder2 satisfies a deceleration judgement condition. In the present embodiment, when a negative differentiated running speed signal vSder2 exceeds a threshold value, e.g., −55 level, a driving state is judged dangerous. A counted value is outputted as a dangerous deceleration time tSder2.

When an engine rotation number is abruptly changed, it is judged that an abrupt accelerating operation is performed, and the driving state is judged dangerous. A dangerous accelerating operation time counting unit 62 counts in synchronization with clock signals a time during which a differentiated engine rotation number signal vRder satisfies an accelerating operation judgement condition. In the present embodiment, a driving state is judged dangerous when a differentiated engine rotation number signal vRder exceeds a set threshold value, e.g., 40 level. A counted value is outputted as a dangerous accelerating operation time tRder.

When a driving roughness signal vSRder exceeds a set threshold value, the driving state is judged dangerous. A driving roughness counting unit 64 counts in synchronization with clock signals a time during which a driving roughness signal vSRder satisfies a driving roughness judgement condition. In the present embodiment when a driving roughness signal exceeds 2.6 level, the driving state is judged dangerous. A counted value is outputted as a driving roughness time tSRder.

Here reference is made back to FIG. 1. A dangerous rotation number time tR, a dangerous braking time tRBder, a dangerous acceleration time tSder1, a dangerous deceleration time tSder2 a dangerous accelerating operation time tRder and a driving roughness time tSRder outputted by the dangerous driving time counting unit 50 are evaluated in 5 ranks by a driving diagnosing unit, based on evaluation references set in an evaluation references setting unit 68 to be outputted in an evaluated engine rotation number signal jR indicative of "intentional acceleration", an evaluated braking urgency signal jRBder indicative of "danger anticipation", an evaluated acceleration signal jSder1 indicative of "smooth acceleration", an evaluated deceleration signal jSder2 indicative of "room for safety upon stopping", an evaluated acceleration signal jRder indicative of "accelerating operation stability", and an evaluated driving roughness signal jSRder indicative of "driving stability". Finally these evaluated signals are synthetically judged to be outputted as a synthetically evaluated signal jT.

The driving diagnosing unit 66 will be detailed with reference to FIG. 4.

Respective dangerous times are evaluated in 5 ranks, depending on those of 975 units of a total driving time taken by the dangerous times.

First, an engine rotation number evaluating unit 70 for evaluating "intended acceleration" evaluates a dangerous engine rotation number time tR in accordance with an engine rotation number evaluating reference to output an evaluated engine rotation number signal jR (hereinafter "j" indicates an evaluated signal). When a dangerous engine rotation number time tR is 0 unit, the intended acceleration is evaluated to be "A rank". When a dangerous engine rotation number time tR is 1 to 3 units, the intended acceleration is evaluated to be "B rank". When a dangerous engine rotation number time tR is 4 to 8 units, the intended acceleration is evaluated to be "C rank". When an engine rotation number time tR is 9 to 13 units, the intended acceleration is evaluated to be "D rank". When a dangerous engine rotation number time tR is 14 or more units, the intended acceleration is evaluated to be "E rank".

A braking urgency evaluating unit 72 for evaluating "danger anticipation" evaluates a dangerous braking time tRBder in accordance with a braking urgency evaluation reference to output an evaluated braking urgency signal jRBder. When a dangerous braking time tRBder is 0 unit, the danger anticipation is evaluated to be "A rank". When a dangerous braking time tRBder is 1 to 2 units, the danger anticipation is evaluated to be "B rank". When a dangerous braking time tRBder is 3 to 4 units, the danger anticipation is evaluated to be "C rank". When a dangerous braking time tRBder is 5 to 6 units, the danger anticipation is evaluated to be "D rank". When a dangerous braking time tRBder is 7 or more units, the danger anticipation is evaluated to be "E rank".

An acceleration evaluating unit 74 for evaluating "smooth acceleration" evaluates a dangerous acceleration time tSder in accordance with an acceleration evaluation reference to output an evaluated acceleration signal jSder1. When a dangerous acceleration time tSder1 is 0 unit, the smooth acceleration is evaluated to be "A rank". When a dangerous acceleration time tSder1 is 1 to 3 units, the smooth acceleration is evaluated to be "B rank". When a dangerous acceleration time tSder1 is 4 to 6 units, the smooth acceleration is evaluated to be "C rank". When a dangerous acceleration time tSder1 is 7 to 8 units, the smooth acceleration is evaluated to be "D rank". When a dangerous acceleration time is 9 or more units, the smooth acceleration is evaluated to be "E rank".

A deceleration evaluating unit 76 for evaluating "room for safety on stopping" evaluates a dangerous deceleration time tSder2 in accordance with a deceleration evaluation reference to output an evaluated deceleration signal jSder2. When a dangerous deceleration time is 0 unit, the room for safety on stopping is evaluated to be "A rank". When a dangerous deceleration time tSder2 is 1 to 3 units, the room is evaluated to be "B rank". When a dangerous deceleration time tSder2 is 4 to 10 units, the room is evaluated to be "C rank". When a dangerous deceleration time tSder2 is 11 to 13 units, the room is evaluated to be "D rank". When a dangerous deceleration time tSder2 is 14 or more units, the room is evaluated to be "E rank".

An acceleration evaluating unit 78 for evaluating "accelerating operation stability" evaluates a dangerous acceleration time tRder in accordance with an acceleration evaluation reference to output an evaluated acceleration signal jRder. When a dangerous acceleration time tRder is 0 unit, the accelerating operation stability is evaluated to be "A rank". When a dangerous acceleration time tRder is 1 to 2 units, the accelerating operation stability is evaluated to be "B rank". When a dangerous acceleration time is 3 to 12 units, the accelerating operation stability is evaluated to be "C rank". When a dangerous acceleration time tRder is 13 to 16 units, the accelerating operation stability is evaluated to be "D rank". When a dangerous acceleration time is 17 or more units, the accelerating operation stability is evaluated to be "E rank".

A driving roughness evaluating unit 80 for evaluating "driving stability" evaluates a driving roughness time tSRder and a dangerous acceleration time tRder in accordance with a driving roughness evaluation reference to output an evaluated driving roughness signal jSRder. When a driving roughness time tSRder is 0 unit, a dangerous accelerating operation time tRder being 1 unit, the driving stability is evaluated to be "A rank". When a driving roughness time tSRder is 1 to 3 units, the driving stability is evaluated to be "B rank". When a driving roughness time tSRder is 4 to 8 units, the driving stability is evaluated to be "C rank". When a driving roughness time tSRder is 9 to 10 units, the driving stability is evaluated to be "D rank". When a driving roughness time tSRder is 11 or more units, the driving stability is evaluated to be "E rank".

A synthetic evaluation unit 82 evaluates in accordance with a synthetic evaluation reference an evaluated engine rotation signal jR indicative of "intended acceleration", an evaluated braking urgency signal jRBder indicative of "danger anticipation", an evaluated acceleration signal jSder1 indicative of "danger anticipation", an evaluated acceleration signal jSder1 indicative of "smooth acceleration", an evaluated deceleration signal jSder2 indicative of "room for safety on stopping", an evaluated accelerating operation signal jRder indicative of "accelerating operation stability", and an evaluated driving roughness signal jSRder indicative of "driving stability" to output a synthetically evaluated signal jT.

"A rank" gains 5 points; "B rank", 4 points; "C rank", 3 points; "D rank", 2 points and "E rank", 1 point, and points of the evaluated signals are arithmetically or geometrically averaged. When an average value of the evaluated signals is 5 points, the synthetically evaluated signal jT is judged to be "A rank". When an average value of evaluated signals is equal to or larger than 4.5 points but smaller than 5 points exclusive of 5 points, a synthetically evaluated signal jT is judged to be "B+ rank". When an average value of evaluated signals is equal to or larger than 4 points but smaller than 4.5 points exclusive of 4.5 points, a synthetically evaluated signal jT is judged to be "B rank". When an average value of evaluated signals is equal to or higher than 3.6 points but smaller than 4 points exclusive of 4 points, a synthetically evaluated signal jT is judged to be "B-rank". When an average value of evaluated signals is equal to or higher than 3.2 points but smaller than 3.6 points exclusive of 3.6 points, a synthetically evaluated signal jT is judged to be "C+ rank". When an average value of evaluated signals is equal to or higher than 2.8 points but smaller than 3.2 points exclusive of 3.2 points, a synthetically evaluated signal jT is judged to be "C rank". When an average value of evaluated signals is equal to or higher than 2.6 points but smaller than 2.8 exclusive of 2.8 points, a synthetically evaluated signal jT is judged to be "C- rank". When an average value of evaluated signals is equal to or higher than 1.6 points but smaller than 2.6 points, a synthetically evaluated signal jT is judged to be "D rank". When an average value of evaluated signals is 1.6 points exclusive of 1.6 points, a synthetically evaluated signal jT is judged to be "E rank". The synthetical judgement is based on the five-rank evaluation, but "B rank" and "C rank" are subdivided respectively in further three ranks for more elaborate diagnosis.

Here the description will be back to FIG. 1. A diagnosed results display unit 84 connected to the driving diagnosing unit 66 displays a dangerous engine rotation number time tR, a dangerous braking time tRBder, a dangerous acceleration time tSder1, a dangerous deceleration time tSRder, a dangerous accelerating operation time rRder and a driving roughness time tSRder, which are to be inputted to the a driving diagnosing unit 66, and an evaluated engine rotation number signal jR, an evaluated braking urgency signal jRBder, an evaluated acceleration signal jSder1, an evaluated deceleration signal jSder2, an evaluated accelerating operation signal jRder, an evaluated driving roughness signal jSRder, and a synthetically evaluated signal jT, which are generated by the driving diagnosing unit 66.

Figure 7:
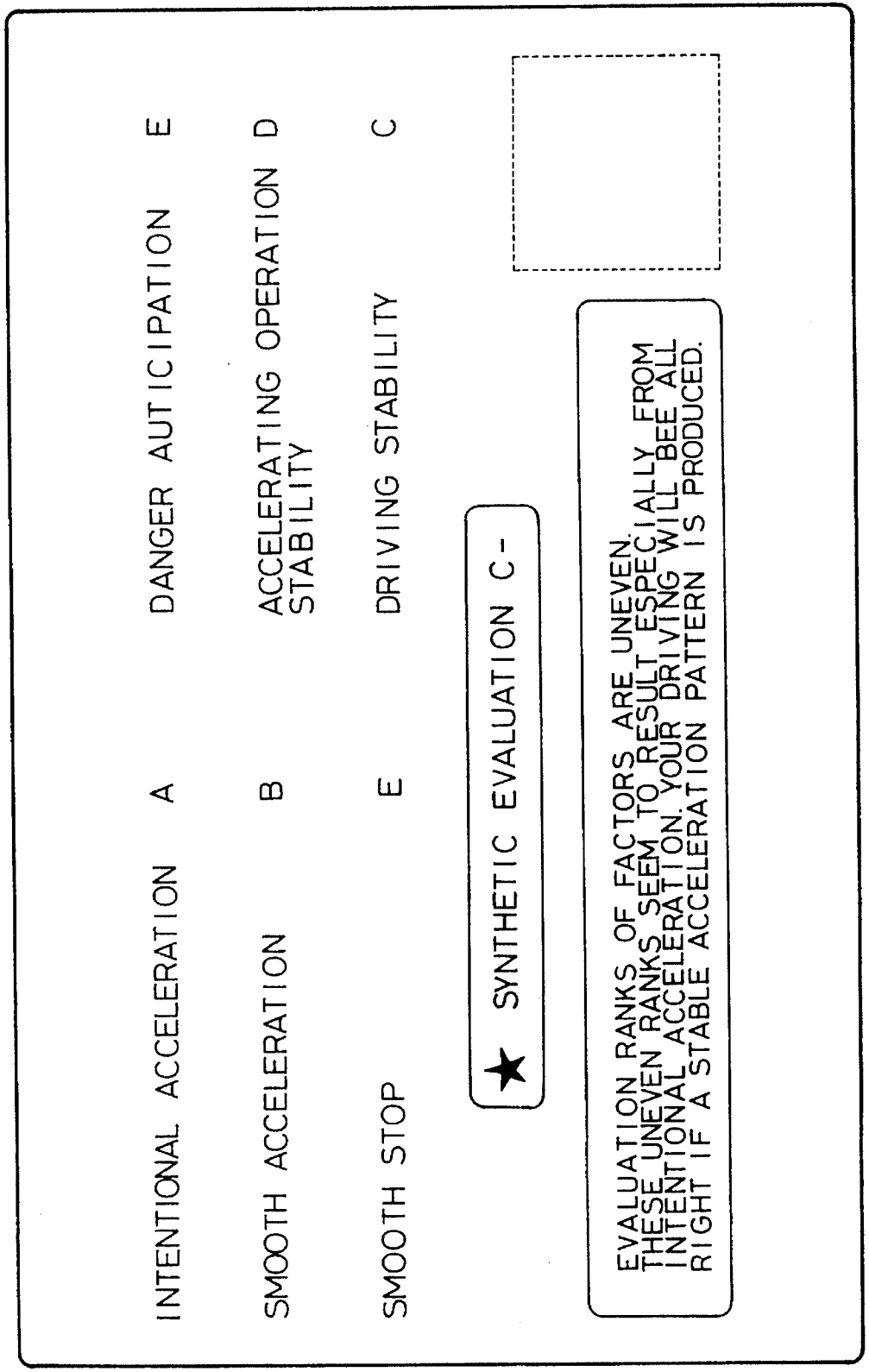
FIG. 7 is a view of one example of diagnosed results displayed by the motor vehicle driving analytically diagnosing device according to the embodiment of FIG. 1.
Figure 8:
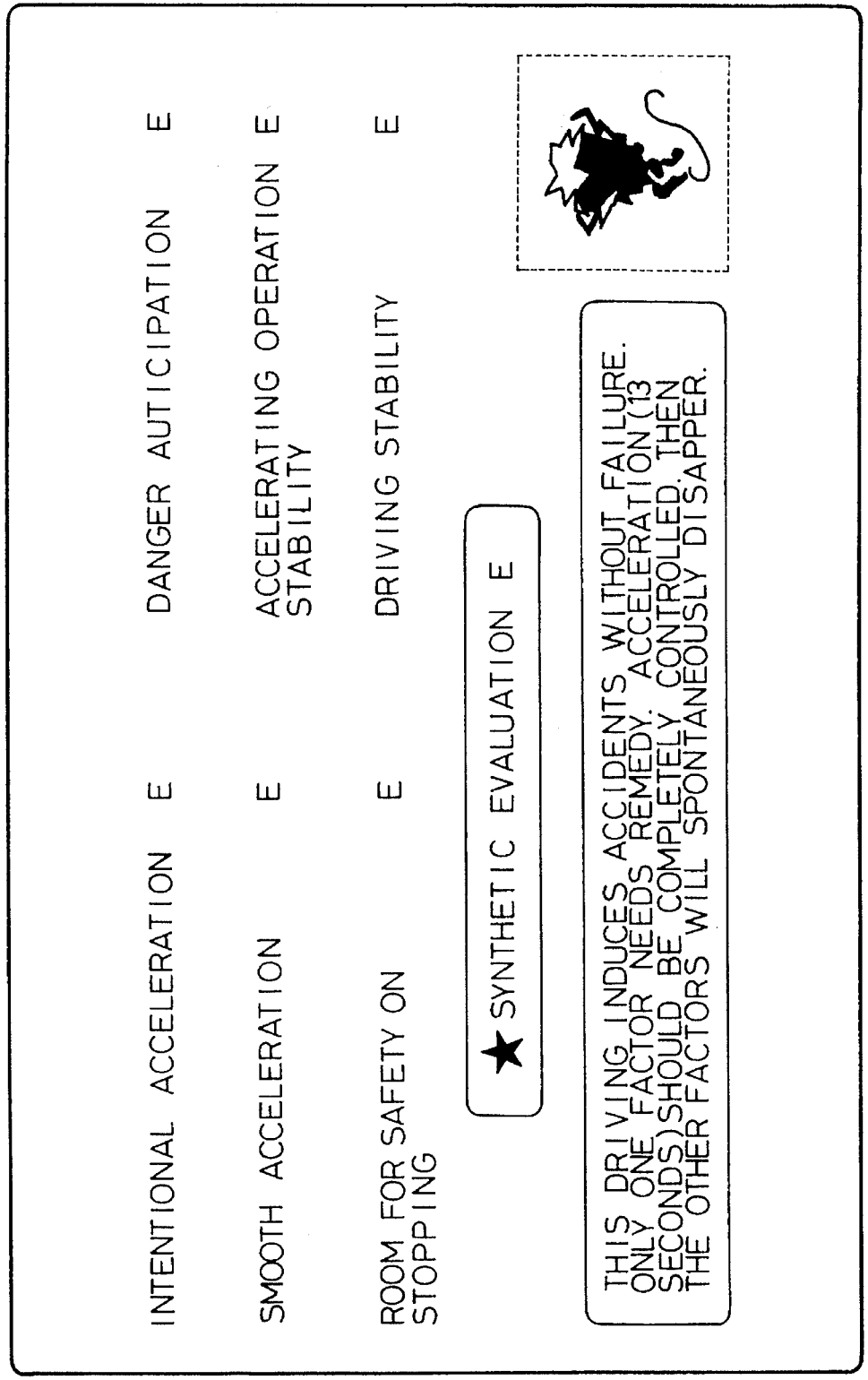
FIG. 8 is a view of another example of diagnosed results displayed by the motor vehicle driving analytically diagnosing device according to the embodiment of FIG. 1.

As exemplified in FIGS. 7 and 8, an evaluated engine rotation number signal jR, an evaluated braking urgency signal jRBder, an evaluated acceleration signal jSder1, an evaluated deceleration signal jSder2, an evaluated accelerating operation signal jRder, an evaluated driving roughness signal jSRder, and a synthetically evaluated signal jT are displayed in the upper part; at the center are displayed comments selected out of preset comments in accordance with diagnosis results; and a dangerous engine rotation number time tR, a dangerous braking operation time tRBder, a dangerous acceleration time tSder1,, a dangerous deceleration time tSder2, a dangerous accelerating operation time tRder and a driving roughness time tSRder are displayed at the bottom.

Thus according to the present embodiment, a driving state of a motor vehicle can be grasped in good detail to diagnose driving patterns of a driver.

Figure 9:
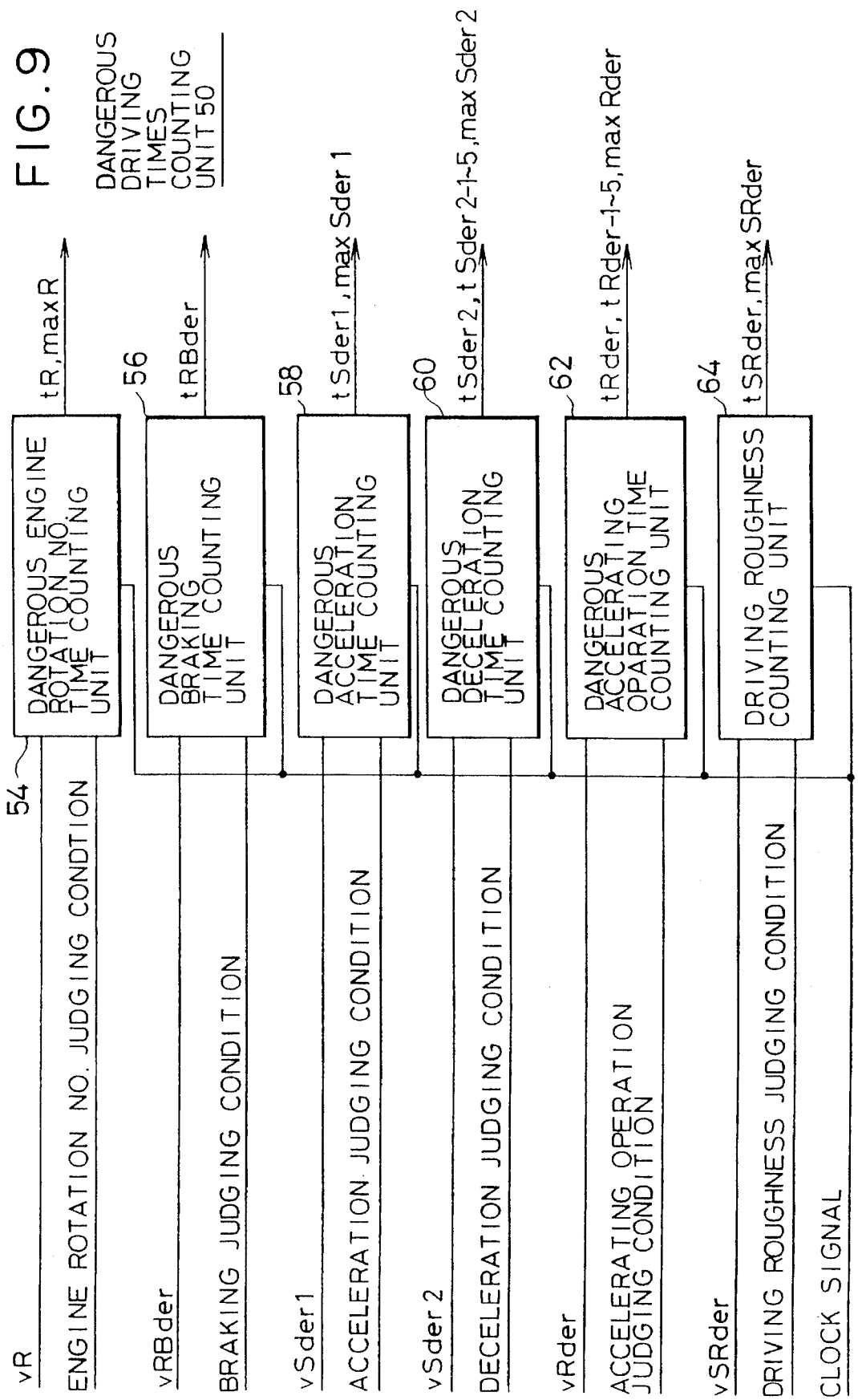
FIG. 9 is a block diagram showing in good detail the dangerous driving times counting unit of the motor vehicle driving analytically diagnosing device according to another embodiment of the present invention.

The motor vehicle driving analytically diagnosing device according to another embodiment of the present invention will be explained with reference to FIGS. 9 and 10. The present embodiment differs from the above described embodiment in the dangerous driving time counting unit 50 and the driving diagnosing unit 66.

The dangerous driving times counting unit 50 will be explained in detail with reference to FIG. 9. In the present embodiment, a total driving time is divided in 975 units, and a dangerous driving time is counted in the units during the total driving time.

A dangerous engine rotation number driving time counting unit 54 judges a driving state dangerous based on an engine rotation number signal vR. The dangerous engine rotation number driving time counting unit 54 counts in synchronization with clock signals a time during which the engine rotation number signal vR is larger than e.g., 2400 rpm. A counted value is outputted as an engine rotation number dangerous time tR. The dangerous engine rotation number driving time counting unit 54 also detects the maximum of the engine rotation number. A detected value is outputted as an maximum engine rotation number maxR (hereinafter "max" means a maximum value).

A dangerous braking times counting unit 56 judges a driving state dangerous based on a braking urgency signal RBder. The dangerous braking times counting unit 56 counts in synchronization with clock signals a time during which a braking urgency signal RBder exceeds e.g., 35 level. A counted value is outputted as a dangerous braking time tRBder.

A dangerous acceleration time counting unit 58 judges a driving state dangerous based on a positive differentiated running speed signal vSder1. The dangerous acceleration time counting unit 58 counts in synchronization with clock signals a time during which the positive differentiated running speed signal vSsder1 exceeds e.g., 50 level. A counted value is outputted as a dangerous acceleration time tSder1.

The dangerous acceleration time counting unit 58 also detects the maximum of the positive differentiated running speed signal vSder1. A detected value is outputted as an maximum acceleration maxSder1.

A dangerous deceleration time counting unit 60 judges a driving state dangerous based on a negative differentiated running speed signal vSder2. The dangerous deceleration time counting unit 60 counts in synchronization with clock signals a time during which the negative differentiated running speed signal vSder2 is less than e.g., −55 level. A counted value is outputted as a dangerous deceleration time tSder2.

The dangerous deceleration time counting unit 60 counts in synchronization with clock signals a time during which the negative differentiated running speed signal vSder2 is less than −55 level and not less than −60 level. A counted value is outputted as a dangerous deceleration time tSder2-1.

The dangerous deceleration time counting unit 60 counts in synchronization with clock signals a time during which the negative differentiated running speed signal vSder2 is less than −60 level and not less than −65 level. A counted value is outputted as a dangerous deceleration time tSder2-2.

The dangerous deceleration time counting unit 60 counts in synchronization with clock signals a time during which the negative differentiated running speed signal vSder2 is less than −65 level and not less than −75 level. A counted value is outputted as a dangerous deceleration time tSder2-3.

The dangerous deceleration time counting unit 60 counts in synchronization with clock signals a time during which the negative differentiated running speed signal vSder2 is less than −75 level and not less than −85 level. A counted value is outputted as a dangerous deceleration time tSder2-4.

The dangerous deceleration time counting unit 60 counts in synchronization with clock signals a time during which the negative differentiated running speed signal vSder2 is less than −85 level. A counted value is outputted as a dangerous deceleration time tSder2-5.

The dangerous deceleration time counting unit 60 also detects the maximum of the absolute value of the negative differentiated running speed signal vSder2. A detected value is outputted as a maximum deceleration maxSder2.

A dangerous accelerating operation time counting unit 62 judges a driving state dangerous based on a differentiated engine rotation number signal vRder. The dangerous accelerating operation time counting unit 62 counts in synchronization with clock signals a time during which a differentiated engine rotation number signal vRder is less than e.g., −50 level. A counted value is outputted as a dangerous accelerating operation time tRder.

The dangerous accelerating operation time counting unit 62 counts in synchronization with clock signals a time during which a differentiated engine rotation number signal vRder is less than −50 level and not less than −55 level. A counted value is outputted as a dangerous accelerating operation time tRder-1.

The dangerous accelerating operation time counting unit 62 counts in synchronization with clock signals a time during which a differentiated engine rotation number signal vRder is less than −55 level and not less than −60 level. A counted value is outputted as a dangerous accelerating operation time tRder-2.

The dangerous accelerating operation time counting unit 62 counts in synchronization with clock signals a time during which a differentiated engine rotation number signal vRder is less than −60 level and not less than −65 level. A counted value is outputted as a dangerous accelerating operation time tRder-3.

The dangerous accelerating operation time counting unit 62 counts in synchronization with clock signals a time during which a differentiated engine rotation number signal vRder is less than −65 level and not less than −70 level. A counted value is outputted as a dangerous accelerating operation time tRder-4.

The dangerous accelerating operation time counting unit 62 counts in synchronization with clock signals a time during which a differentiated engine rotation number signal vRder is less than −70 level. A counted value is outputted as a dangerous accelerating operation time tRder-5.

The dangerous accelerating operation time counting unit 62 also detects the maximum of the absolute value of the differentiated engine rotation number signal vRder. A detected value is outputted as a maximum differentiated engine rotation number maxRder.

A driving roughness counting unit 64 judges a driving state dangerous based on a driving roughness signal vSRder. The driving roughness counting unit 64 counts in synchronization with clock signals a time during which the driving roughness signal vSRder exceeds 2.6 level. A counted value is outputted as a driving roughness time tSRder. The driving roughness counting unit 64 detects the maximum of the driving roughness signal vSRder. A detected value is outputted as a maximum driving roughness maxSRder.

The driving diagnosing unit 66 will be detailed with reference to FIG. 10.

Respective dangerous times are evaluated in 5 ranks, depending on those of 975 units of a total driving time taken by the dangerous times and the maximum values of those signals.

First, an engine rotation number evaluating unit 70 for evaluating "intended acceleration" evaluates a dangerous engine rotation number time tR and a maximum engine rotation number maxR in accordance with an engine rotation number evaluating reference to output an evaluated engine rotation number signal jR (hereinafter "j" indicates an evaluated signal).

When a dangerous engine rotation number time tR is 0 unit, the intended acceleration is evaluated to be "A rank".

When a dangerous engine rotation number time tR is 1 unit and a maximum engine rotation number maxR is not more than 2430 rpm, the intended acceleration is evaluated to be "B rank".

When a dangerous engine rotation number time tR and a maximum engine rotation number maxR are not evaluated in "B rank", a dangerous engine rotation number time tR is not more than 8 units and a maximum engine rotation number maxR is less than e.g., 2600 rpm, the intended acceleration is evaluated to be "C rank".

When a dangerous engine rotation number time tR and a maximum engine rotation number maxR are evaluated in neither "B rank" nor "C rank" and a dangerous engine rotation number time tR is not more than 13 units, the intended acceleration is evaluated to be "D rank".

When a dangerous engine rotation number time tR is not less than 13 units, the intended acceleration is evaluated to be "E rank".

A braking urgency evaluating unit 72 for evaluating "danger anticipation" evaluates a dangerous braking time tRBder in accordance with a braking urgency evaluation reference to output an evaluated braking urgency signal jRBder.

When a dangerous braking time tRBder is 0 to 1 unit, the danger anticipation is evaluated to be "A rank". When a dangerous braking time tRBder is 2 units, the danger anticipation is evaluated to be "B rank". When a dangerous braking time tRBder is 3 to 4 units, the danger anticipation is evaluated to be "C rank". When a dangerous braking time tRBder is 5 to 6 units, the danger anticipation is evaluated to be "D rank". When a dangerous braking time tRBder is 7 or more units, the danger anticipation is evaluated to be "E rank".

An acceleration evaluating unit 74 for evaluating "smooth acceleration" evaluates a dangerous acceleration time tSder1 and a maximum acceleration maxSder1 in accordance with an acceleration evaluation reference to output an evaluated acceleration signal jSder1.

When a dangerous acceleration time tSder1 is 0 unit, the smooth acceleration is evaluated to be "A rank".

When a dangerous acceleration time tSder1 is 1 to 2 units and a maximum acceleration maxSder1 is not more than 51 level, the smooth acceleration is evaluated to be "B rank".

When a dangerous acceleration time tSder1 and a maximum acceleration maxSder1 are not evaluated in "B rank", a dangerous acceleration time tSder1 is not more than 6 units, and a maximum acceleration maxSder1 is not more than 56 level, the smooth acceleration is evaluated to be "C rank".

When a dangerous acceleration time tSder1 and a maximum acceleration maxSder1 is not evaluated in neither "B rank" nor "C rank" and a dangerous acceleration time tSder1 is not more than 10 units, the smooth acceleration is evaluated to be "D rank".

When a dangerous acceleration time is 11 or more units, the smooth acceleration is evaluated to be "E rank".

A deceleration evaluating unit 76 for evaluating "room for safety on stopping" evaluates a dangerous deceleration time tSder2, tSder2-1, tSder2-2, tSder2-3, tSder2-4 and tSder2-5, and a maximum deceleration maxSder2 in accordance with a deceleration evaluation reference to output an evaluated deceleration signal jSder2.

When a dangerous deceleration time tSder2 is not more than 5 units, a maximum deceleration maxSder2 is not more than −68 level, and a dangerous deceleration time tSder2-3 is not more than 1 unit, the room for safety on stopping is evaluated to be "A rank".

When a dangerous deceleration time tSder2, tSder2-1, tSder2-2, tSder2-3, tSder2-4, tSder2-5 and a maximum deceleration maxSder2 are not evaluated in "A rank", a dangerous deceleration time tSder2 is not more than 8 units, a maximum deceleration maxSder2 is not more than −75 level, and a dangerous deceleration time tSder2-3 is not more than 2 units, the room for safety on stopping is evaluated to be "B rank".

When a dangerous deceleration time tSder2, tSder2-1, tSder2-2, tSder2-3, tSder2-4, tSder2-5 and a maximum deceleration maxSder2 are evaluated in neither "A rank" nor "B rank", a dangerous deceleration time tSder2 is not more than 14 units, a maximum deceleration maxSder2 is not more than −80 level, and a dangerous deceleration time tSder2-4 is not more than 3 units, the room for safety on stopping is evaluated to be "C rank".

When a dangerous deceleration time tSder2, tSder2-1, tSder2-2, tSder2-3, tSder2-4, tSder2-5 and a maximum deceleration maxSder2 are evaluated in neither "A rank", "B rank", nor "C rank", a dangerous deceleration time tSder2 is not more than 15 units, and a dangerous deceleration time tSder2-5 is not more than 2 units, the room for safety on stopping is evaluated to be "D rank".

When a dangerous deceleration time tSder2, tSder2-1, tSder2-2, tSder2-3, tSder2-4, tSder2-5 and a maximum deceleration maxSder2 are evaluated in neither "A rank", "B rank", "C rank", nor D rank", the room for safety on stopping is evaluated to be "E rank".

An acceleration evaluating unit 78 for evaluating "accelerating operation stability" evaluates a dangerous acceleration time tRder, tRder-1, tRder-2, tRder-3, tRder-4 and tRder-5, and a maximum differentiated engine rotation number maxRder in accordance with an acceleration evaluation reference to output an evaluated acceleration signal jRder.

When a dangerous acceleration time tRder is not more than 3 units, a maximum differentiated engine rotation number maxRder is not more than 58 level, and a dangerous acceleration time tRder-2 is not more than 1 unit, the accelerating operation stability is evaluated to be "A rank".

When a dangerous acceleration time tRder, tRder-1, tRder-2, tRder-3, tRder-4, tRder-5, and a maximum differentiated engine rotation number maxRder are not evaluated in "A rank", a dangerous acceleration time tRder is not more than 5 units, a maximum differentiated engine rotation number maxRder is not more than 62 level, and a dangerous acceleration time tRder-3 is not more than 1 unit, the accelerating operation stability is evaluated to be "B rank".

When a dangerous acceleration time tRder, tRder-1, tRder-2, tRder-3, tRder-4, tRder-5, and a maximum differentiated engine rotation number maxRder are evaluated in neither "A rank" nor "B rank", a dangerous acceleration time tRder is not more than 13 units, a maximum differentiated engine rotation number maxRder is not more than 67 level, and a dangerous acceleration time tRder-4 is not more than 1 unit, the accelerating operation stability is evaluated to be "C rank".

When a dangerous acceleration time tRder, tRder-1, tRder-2, tRder-3, tRder-4, tRder-5, and a maximum differentiated engine rotation number maxRder are evaluated in neither "A rank", "B rank", nor "C rank", and a dangerous acceleration time tRder is not more than 17 units, the accelerating operation stability is evaluated to be "D rank".

When a dangerous acceleration time tRder, tRder-1, tRder-2, tRder-3, tRder-4, tRder-5, and a maximum differentiated engine rotation number maxRder are evaluated in neither "A rank", "B rank", "C rank", nor "D rank", the accelerating operation stability is evaluated to be "D rank".

A driving roughness evaluating unit 80 for evaluating "driving stability" evaluates a driving roughness time tSRder, a maximum driving roughness maxSRder, and a maximum differentiated engine rotation number maxRder in accordance with a driving roughness evaluation reference to output an evaluated driving roughness signal jSRder.

When a driving roughness time tSRder is not more than 3 units, a maximum driving roughness maxSRder is not more than 3.2 level, and a maximum differentiated engine rotation number maxRder is not more than 58 level, the driving stability is evaluated to be "A rank".

When a driving roughness time tSRder, a maximum driving roughness maxSRder, and a maximum differentiated engine rotation number maxRder are not evaluated in "A rank", a driving roughness time tSRder is not more than 3 units, a maximum driving roughness maxSRder is not more than 3.4 level, and a maximum differentiated engine rotation number maxRder is not more than 62 level, the driving stability is evaluated to be "B rank".

When a driving roughness time tSRder, a maximum driving roughness maxSRder, and a maximum differentiated engine rotation number maxRder are evaluated in neither "A rank" nor "B rank", a driving roughness time tSRder is not more than 7 units, and a maximum driving roughness maxSRder is not more than 4 level, the driving stability is evaluated to be "C rank".

When a driving roughness time tSRder, a maximum driving roughness maxSRder, and a maximum differentiated engine rotation number maxRder are evaluated in neither "A rank", "B rank", nor "C rank", and a driving roughness time tSRder is not more than 12 units, the driving stability is evaluated to be "D rank".

When a driving roughness time tSRder, a maximum driving roughness maxSRder, and a maximum differentiated engine rotation number maxRder are evaluated in neither "A rank", "B rank", "C rank", nor "D rank", the driving stability is evaluated to be "E rank".

A synthetic evaluation unit 82 evaluates in accordance with a synthetic evaluation reference an evaluated engine rotation signal jR indicative of "intended acceleration", an evaluated braking urgency signal jRBder indicative of "danger anticipation", an evaluated acceleration signal jSder1 indicative of "danger anticipation", an evaluated acceleration signal jSder1 indicative of "smooth acceleration", an evaluated deceleration signal jSder2 indicative of "room for safety on stopping", an evaluated accelerating operation signal jRder indicative of "accelerating operation stability", and an evaluated driving roughness signal jSRder indicative of "driving stability" to output a synthetically evaluated signal jT.

"A rank" gains 5 points; "B rank", 4 points; "C rank", 3 points; "D rank", 2 points and "E rank", 1 point, and points of the evaluated signals are arithmetically or geometrically averaged. When an average value of the evaluated signals is 5 points, the synthetically evaluated signal jT is judged to be "A rank". When an average value of evaluated signals is equal to or larger than 4.5 points but smaller than 5 points exclusive of 5 points, a synthetically evaluated signal iT is judged to be "B+rank". When an average value of evaluated signals is equal to or larger than 4 points but smaller than 4.5 points exclusive of 4.5 points, a synthetically evaluated signal iT is judged to be "B rank". When an average value of evaluated signals is equal to or higher than 3.6 points but smaller than 4 points exclusive of 4 points, a synthetically evaluated signal iT is judged to be "B-rank". When an average value of evaluated signals is equal to or higher than 3.2 points but smaller than 3.6 points exclusive of 3.6 points, a synthetically evaluated signal iT is judged to be "C+ rank". When an average value of evaluated signals is equal to or higher than 2.8 points but smaller than 3.2 points exclusive of 3.2 points, a synthetically evaluated signal iT is judged to be "C rank". When an average value of evaluated signals is equal to or higher than 2.6 points but smaller than 2.8 exclusive of 2.8 points, a synthetically evaluated signal iT is judged to be "C- rank". When an average value of evaluated signals is equal to or higher than 1.6 points but smaller than 2.6 points, a synthetically evaluated signal iT is judged to be "D rank". When an average value of evaluated signals is 1.6 points exclusive of 1.6 points, a synthetically evaluated signal iT is judged to be "E rank".

Thus according to the present embodiment, a driving state of a motor vehicle can be grasped in good detail to diagnose driving patterns of a driver.

The present invention is not limited to the above-described embodiments but includes various modifications.

For example, in the above-described embodiments, to detect an accelerating operation, engine rotation numbers are detected, but it is possible to directly detect motions of an accelerator pedal.

Figure 11A:
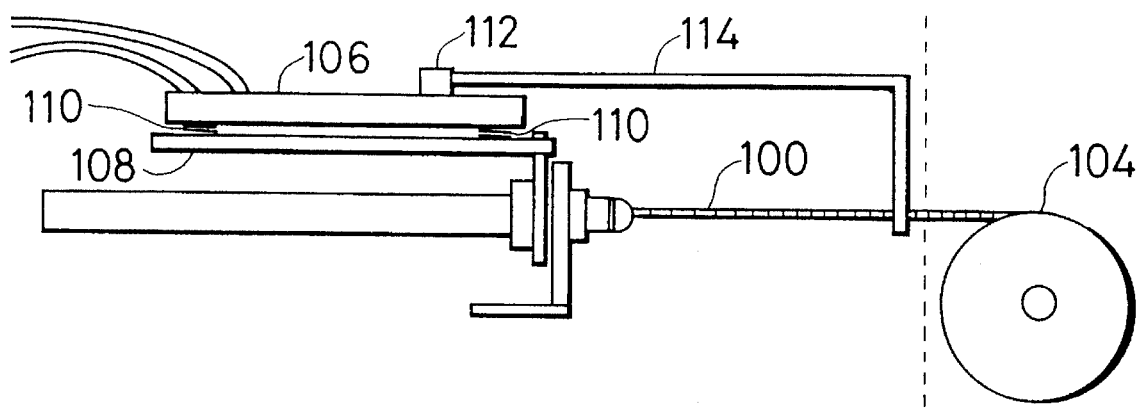
FIGS. 11A and B are views of an example of the mechanism for detecting motions of an accelerator pedal.
Figure 11B:
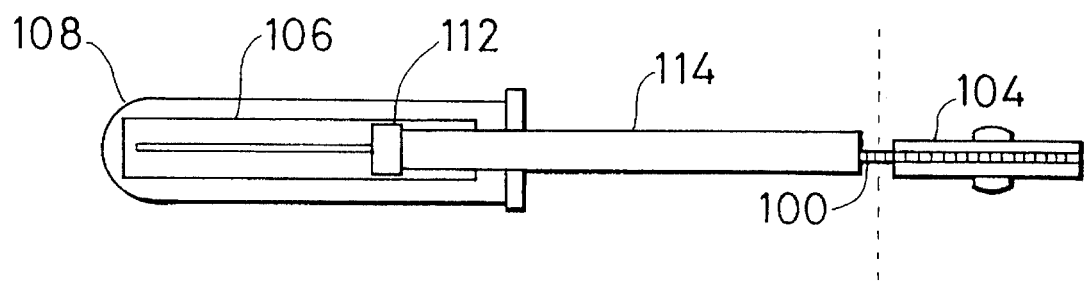

FIG. 11 shows an example of a mechanism for detecting motions of an accelerator pedal. FIG. 11A is a front view, and FIG. 11B is a plan view.

A wire rope 100 connected to an accelerator pedal (not shown) is passed through a rod 102 secured to an engine body (not shown). The forward end of the wire rope 100 is connected to a carburetor 104 to control the carburetor 104 in accordance with operations of the accelerator pedal. In the present example, the accelerator pedal is detected by a sliding electric resistor 106. The sliding electric resistor 106 is secured to a resistor base 108 through a spring 110. The resistor base 108 is attached to the rod 102 secured to the engine body. A moving contact 112 of the sliding electric resistor 106 is secured to the wire rope 100 by an L-shaped arm 114.

When the accelerator pedal is operated, the wire rope 100 is moved to control the carburetor 104, while the moving contact 112 of the sliding electric resistor 106 is slid through the arm 114 connected to the wire rope 100 to thereby change a resistance value. A change of a resistance value of the sliding electric resistor 106 is converted by a detection circuit (not shown) into a voltage signal so as to directly detect a motion of the accelerator pedal.

The analyzed signals, judgement conditions, evaluation references and display method used in the above-described embodiments are only one example. Any other analyzed signals, judgement conditions, evaluation references which will allow driving patterns of drivers to be correctly grasped and evaluated may be used.

In the above-described embodiments, the diagnosed results are shown in the display unit, but it is possible that driving states of a driver are incessantly detected and analyzed by the present invention, and when a dangerous driving patter appears, it is acoustically alarmed.

As described above, according to the present invention, a running speed, an accelerating operation and a braking operation of a motor vehicle are detected, the detected running speed signal, accelerating operation signal and the braking operation signal are analyzed to generate required analyzed signals indicative of driving states of the driver, dangerous driving times in which the analyzed signals satisfy danger judgement conditions in a certain period of driving time are counted, and the driving of the driver in the certain period of driving time is diagnosed based on a ratio of the dangerous driving times to the certain period of driving time. Consequently driving states of a motor vehicle can be grasped in good detail, so that driving patterns of a driver can be correctly analyzed and diagnosed. Thus, the motor vehicle driving analytically diagnosing method according to the present invention can drastically improve safety drive abilities of individual drivers and much contribute to the decrease of motor vehicle accidents.

What is claimed is:

1. A motor vehicle driving analytically diagnosing method for analyzing the driving states of a driver of the motor vehicle comprising the steps of:

detecting a running speed, acceleration, and braking of a motor vehicle and outputting signals representative thereof;

generating analyzed signals indicative of driving states of a driver in response to a detected running speed signal, an acceleration signal and a braking signal from said detecting step;

counting dangerous driving times during which the analyzed signals satisfy predetermined danger judging conditions in a certain period of driving time; and producing at least one signal representing a driving history of the driver during said certain period of driving time, based on comparisons of the dangerous driving times to corresponding reference signals, wherein said generating step comprises the steps of:

differentiating the running speed signal, the acceleration signal, and the braking signal to generate a differentiated running speed signal, a differentiated acceleration signal, and a differentiated braking signal, respectively;

generating a braking urgency signal indicative of urgency of braking of the driving of the driver based on the differentiated acceleration signal and the differentiated braking signal;

generating a driving roughness signal indicative of roughness of the driving of the driver based on the differentiated running speed signal and the differentiated acceleration signal; and outputting the acceleration signal, the braking urgency signal, the differentiated running speed signal, the differentiated acceleration signal, and the driving roughness signal as the analyzed signals;

said counting step comprising the steps of counting, as part of said dangerous driving times, a time during which the acceleration signal has exceeded a predetermined value, a time during which the braking urgency signal has exceeded a predetermined value, a time during which a positive value of the differentiated running speed signal has exceeded a predetermined value, a time during which an absolute value of a negative value of the differentiated running speed signal has exceeded a predetermined value, a time during which the differentiated acceleration signal has exceeded a predetermined value, and a time during which the driving roughness signal has exceeded a predetermined value.

2. A motor vehicle driving analytically diagnosing method according to claim 1, wherein the braking urgency signal is generated by multiplying the differentiated acceleration signal with the differentiated braking signal; and the driving roughness signal is generated by multiplying the differentiated running speed signal with the differentiated acceleration signal.

3. A motor vehicle diving analytically diagnosing method according to claim 1, wherein said generating step comprises the steps of:

differentiating the running speed signal, the acceleration signal and the braking signal to generate a differentiated running speed signal, a differentiated acceleration signal and a differentiated braking signal, respectively;

generating a braking urgency signal indicative of urgency of braking of the driving of the driver based on the differentiated acceleration signal and the differentiated braking signal;

generating a driving roughness signal indicative of roughness of the driving of the driver based on the differentiated running speed signal and the differentiated acceleration signal; and outputting the acceleration signal, the braking urgency signal, the differentiated running speed signal, the differentiated acceleration signal and the driving roughness signal as the analyzed signals;

said counting steps comprising the steps of counting, as part of said period of dangerous driving, a time during which the acceleration signal has exceeded a predetermined value, a time during which the braking urgency signal has exceeded a predetermined value, a time during which a positive value of the differentiated running speed signal has exceeded a predetermined value, a time during which an absolute value of a negative value of the differentiated running speed signal has exceeded a predetermined value, a time during which differentiated acceleration signal has exceeded a predetermined value, and a time during which the driving roughness signal has exceeded a predetermined value.

4. A motor vehicle driving analytically diagnosing method according to claim 3, wherein the braking urgency signal is generated by multiplying the differential acceleration signal with the differentiated braking signal; and the driving roughness signal is generated by multiplying the differentiated running speed signal with the differentiated acceleration signal.

5. A motor vehicle driving analytically diagnosing method for analyzing the driving state of a driver of the motor vehicle comprising the steps of:

detecting a running speed, acceleration, and braking of a motor vehicle and outputting signals representative thereof;

generating analyzed signals indicative of driving states of a driver in response to a detected running speed signal, an acceleration signal, and a braking signal from said detecting step;

counting dangerous driving times during which the analyzed signals satisfy predetermined danger judging conditions in a certain period of driving time;

detecting maximum values of the analyzed signals in the certain period of driving time; and producing at least one signal representing a driving history of the driver during said certain period of driving time, based on comparisons of the dangerous driving times to corresponding reference signals and the maximum values of the analyzed signals, wherein said generating step comprises the steps of:

differentiating the running speed signal, the acceleration signal, and the braking signal to generate a differentiated running speed signal, a differentiated acceleration signal, and a differentiated braking signal, respectively;

generating a braking urgency signal indicative of urgency of braking of the driving of the driver based on the differentiated acceleration signal and the differentiated braking signal;

generating a driving roughness signal indicative of roughness of the driving of the driver based on the differentiated running speed signal, and the differentiated acceleration signal; and outputting the acceleration signal, the braking urgency signal, the differentiated running speed signal, the differentiated acceleration signal, and the driving roughness signal as the analyzed signals;

said counting step comprising the steps of counting, as part of said dangerous driving times, a time during which the acceleration signal has exceeded a predetermined value, a time during which the braking urgency signal has exceeded a predetermined value, a time during which a positive value of the differentiated running speed signal has exceeded a predetermined value, a time during which an absolute value of a negative value of the differentiated running speed signal has exceeded a predetermined value, a time during which the differentiated acceleration signal has exceeded a predetermined value, and a time during which the driving roughness signal has exceeded a predetermined value; and said maximum value detecting step comprising the steps of detecting a maximum value of the acceleration signal, a maximum value of a positive value of the differentiated running speed signal, a maximum value of an absolute value of a negative value of the differentiated running speed signal, a maximum value of the differentiated acceleration signal, and a maximum value of the driving roughness signal.

6. A motor vehicle driving analytically diagnosing method according to claim 5, wherein the braking urgency signal is generated by multiplying the differentiated acceleration signal with the differentiated braking signal; and the driving roughness signal is generated by multiplying the differentiated running speed signal with the differentiated acceleration signal.

7. A motor vehicle driving analytically diagnosing method according to claim 5, wherein said generating step comprises the steps of:

differentiating the running speed signal, the acceleration signal and the braking signal to generate a differentiated running speed signal, a differentiated acceleration signal and a differentiated braking signal, respectively;

generating a braking urgency signal indicative of urgency of braking of the driving of the driver based on the differentiated acceleration signal and the differentiated braking signal;

generating a driving roughness signal indicative of roughness of the driving of the driver based on the differentiated running speed signal and the differentiated acceleration signal; and outputting the acceleration signal, the braking urgency signal, the differentiated running speed signal, the differentiated acceleration signal and the driving roughness signal as the analyzed signals;

said counting step comprising the steps of counting, as part of said dangerous driving times, a time during which the acceleration signal has exceeded a predetermined value, a time during which the braking urgency signal has exceeded a predetermined value, a time during which a positive value of the differentiated running speed signal has exceeded a predetermined value, a time during which an absolute value of a negative value of the differentiated running speed signal has exceeded a predetermined value, a time during which differentiated acceleration signal has exceeded a predetermined value, and a time during which the driving roughness signal has exceeded a predetermined value; and said maximum value detecting step comprising the steps of detecting a maximum value of the acceleration signal, a maximum value of a positive value of the differentiated running speed signal, a maximum value of an absolute value of a negative value of the differentiated running speed signal, a maximum value of the differentiated acceleration signal, and a maximum value of the roughness signal.

8. A motor vehicle driving analytically diagnosing method according to claim 7, wherein the braking urgency signal is generated by multiplying the differentiated braking signal; and the driving roughness signal is generated by multiplying the differentiated running speed signal with the differentiated acceleration signal.

9. A motor vehicle driving analytically diagnosing device for analyzing the driving states of a driver of the motor vehicle, comprising:

running speed detecting means for detecting a running speed of a motor vehicle and outputting a running speed signal;

acceleration detecting means for detecting an acceleration of the motor vehicle and outputting an acceleration signal;

braking detecting means for detecting a braking of the motor vehicle and outputting a braking signal;

a detected signals analyzing unit for generating analyzed signals in response to said running speed signal, said acceleration signal, and said braking signal, said analyzed signals indicating driving states of a driver;

a dangerous driving times counting unit for counting dangerous driving times during which the analyzed signals satisfy predetermined danger judging conditions in a certain period of driving time; and a driving diagnosing unit for producing at least one signal representing a driving history of the driver during said certain period of driving time, based on comparisons of the dangerous driving times to corresponding reference signals, wherein:

the detected signals analyzing unit includes:

signals differentiating means for differentiating the running speed signal, the acceleration signal, and the braking signal to generate a differentiated running speed signal a differentiated acceleration signal, and a differentiated braking signal, respectively, braking urgency signal generating means for generating a braking urgency signal indicative of braking urgency in the driving of the driver, based on the differentiated acceleration signal and the differentiated braking signal, and driving roughness signal generating means for generating a driving roughness signal indicative of the driving roughness of the driving of the driver, based on the differentiated running speed signal and the differentiated acceleration signal;

the detected signals analyzing unit outputting the acceleration signal, the braking urgency signal, the differentiated running speed signal, the differentiated acceleration signal, and the driving roughness signal as the analyzed signals; and wherein the dangerous driving times counting unit comprises means for counting, as part of the dangerous driving times, a time during which the acceleration signal has exceeded a predetermined value, a time during which the braking urgency signal has exceeded a predetermined value, a time during which a positive value of the differentiated running speed signal has exceeded a predetermined value, a time during which an absolute value of a negative value of the differentiated running speed signal has exceeded a predetermined value, a time during which the differentiated acceleration signal has exceeded a predetermined value, and a time during which the driving roughness signal has exceeded a predetermined value.

10. A motor vehicle driving analytically diagnosing device according to claim 9, wherein the braking urgency signal generating means multiplies the differentiated acceleration signal with the differentiated braking signal to generate the braking urgency signal; and the driving roughness signal generating means multiplies the differentiated running speed signal with the differentiated acceleration signal to generate the driving roughness signal.

11. A motor vehicle driving analytically diagnosing device according to claim 9, wherein:

the detected signals analyzing unit includes:

signals differentiating means for differentiating the running speed signal, the acceleration signal and the braking signal to generate a differentiated running speed signal, a differentiated acceleration signal and a differentiated braking signal, respectively, braking urgency signal generating means for generating a braking urgency signal indicative of braking urgency in the driving of the driver, based on the differentiated acceleration signal and the differentiated braking signal, and driving roughness signal generating means for generating a driving roughness signal indicative of driving roughness of the driving of the driver, based on the differentiated running speed signal and the differentiated acceleration signal;

the detected signals analyzing unit outputting the acceleration signal, the braking urgency signal, the differentiated running speed signal, the differentiated acceleration signal and the driving roughness signal as the analyzed signals; and wherein the times counting unit comprises means for counting, as part of the dangerous driving times, a time during which the acceleration signal has exceeded a predetermined value, a time during which the braking urgency signal has exceeded a predetermined value, a time during which a positive value of the differentiated running speed signal has exceeded a predetermined value, a time during which an absolute value of a negative value of the differentiated running speed signal has exceeded a predetermined value, a time during which the differentiated acceleration signal has exceeded a predetermined value, and a time during which the driving roughness signal has exceeded a predetermined value.

12. A motor vehicle driving analytically diagnosing device according to claim 11, wherein the braking urgency signal generating means multiplies the differentiated acceleration signal with the differentiated braking signal to generate the braking urgency signal; and the driving roughness signal generating means multiplies the differentiated running speed signal with the differentiated acceleration signal to generate the driving roughness signal.

13. A motor vehicle driving analytically diagnosing device for analyzing the driving states of a driver of the motor vehicle, comprising:

running speed detecting means for detecting a running speed of a motor vehicle and outputting a running speed signal;

acceleration detecting means for detecting acceleration of the motor vehicle and outputting an acceleration signal;

braking detecting means for detecting braking of the motor vehicle and outputting a braking signal;

a detected signals analyzing unit for generating analyzed signals in response to said running speed signal, said acceleration signal and said braking signal, said analyzed signals indicating driving states of a driver;

a dangerous driving times counting unit for counting dangerous driving times during which the analyzed signals satisfy predetermined danger judging conditions in a certain period of driving, and for detecting maximum, values of the analyzed signals in the certain period of driving; and a driving diagnosing unit for producing at least one signal representing a driving history of the driver during said certain period of driving, based on comparisons of the dangerous driving times to corresponding reference signals and the maximum values of the analyzed signals, wherein:

the detected signals analyzing unit includes:

signals differentiating means for differentiating the running speed signal, the acceleration signal, and the braking signal to generate a differentiated running speed signal, a differentiated acceleration signal, and a differentiated braking signal, respectively, braking urgency signal generating means for generating a braking urgency signal indicative of braking urgency in the driving of the driver, based on the differentiated acceleration signal and the differentiated braking signal, and driving roughness signal generating means for generating a driving roughness signal indicative of driving roughness of the driving of the driver, based on the differentiated running speed signal and the differentiated acceleration signal;

the detected signals analyzing unit outputting the acceleration signal, the braking urgency signal, the differentiated running speed signal, the differentiated acceleration signal, and the driving roughness signal as the analyzed signals;

wherein the dangerous driving times counting unit comprises means for counting, as part of the dangerous driving times, a time during which the acceleration signal has exceeded a predetermined value, a time during which the braking urgency signal has exceeded a predetermined value, a time during which a positive value of the differentiated running speed signal has exceeded a predetermined value, a time during which an absolute value of a negative value of the differentiated running speed signal has exceeded a predetermined value, a time during which the differentiated acceleration signal has exceeded a predetermined value, and a time during which the driving roughness signal has exceeded a predetermine value; and the time counting unit detects as the maximum values of the analyzed signals a maximum value of the acceleration signal, a maximum value of a positive value of the differentiated running speed signal, a maximum value of an absolute value of a negative value of the differentiated running speed signal, a maximum value of the differentiated acceleration signal, and a maximum value of the driving roughness signal.

14. A motor vehicle driving analytically diagnosing device according to claim 13, wherein the braking urgency signal generating means multiplies the differentiated acceleration signal with the differentiated braking signal to generate the braking urgency signal; and the driving roughness signal generating means multiplies the differentiated running speed signal with the differentiated acceleration signal to generate the driving roughness signal.

15. A motor vehicle driving analytically diagnosing device according to claim 13, wherein:

the detected signals analyzing unit includes:

signals differentiating means for differentiating the running speed signal, the acceleration signal and the braking signal to generate a differentiated running speed signal, a differentiated acceleration signal and a differentiated braking signal, respectively, braking urgency signal generating means for generating a braking urgency signal indicative of braking urgency in the driving of the driver, based on the differentiated acceleration signal and the differentiated braking signal, and driving roughness signal generating means for generating a driving roughness signal indicative of driving roughness of the driving of the driver, based on the differentiated running speed signal and the differentiated acceleration signal;

the detected signals analyzing unit outputting the acceleration signal, the braking urgency signal, the differentiated running speed signal, the differentiated acceleration signal and the driving roughness signal as the analyzed signals;

wherein the times counting unit comprises means for counting, as part of the dangerous driving times, a time during which the acceleration signal has exceeded a predetermined value, a time during which the braking urgency signal has exceeded a predetermined value, a time during which a positive value of the differentiated running speed signal has exceeded a predetermined value, a time during which an absolute value of a negative value of the differentiated running speed signal has exceeded a predetermined value, a time during which the differentiated acceleration signal has exceeded a predetermined value, and a time duping which the driving roughness signal has exceeded a predetermined value; and the times counting unit further comprising means for detecting, as part of the maximum values of the analyzed signals, a maximum value of the acceleration signal, a maximum value of a positive value of the differentiated running speed signal, a maximum value of an absolute value of a negative value of the differentiated running speed signal, a maximum value of the differentiated acceleration signal, and a maximum value of the driving roughness signal.

16. A motor vehicle driving analytically diagnosing device according to claim 15, wherein the braking urgency signal generating means multiplies the differentiated acceleration signal with the differentiated braking signal to generate the braking urgency signal; and the driving roughness signal generating means multiplies the differentiated running speed signal with the differentiated acceleration signal to generate the driving roughness signal.

17. A motor vehicle driving analytically diagnosing method for analyzing the driving state of a driver of the motor vehicle comprising the steps of:

detecting a running speed, an engine rotation number, and a braking of a motor vehicle;

outputting a running speed signal, an engine rotation number signal, and a braking signal representative of the detected running speed, engine rotation number, and braking of the motor vehicle, respectively;

generating analyzed signals indicative of a driving state of a driver from the running speed signal, the engine rotation number signal, and the braking signal;

counting dangerous driving times during which the analyzed signals satisfy predetermined danger judging conditions;

evaluating the dangerous driving times with respect to respective evaluation thresholds to produce evaluation signals; and combining the evaluation signals to produce at least one signal representing an evaluation of the driving history of the driver in a certain period of time.

18. A motor vehicle driving analytically diagnosing method for analyzing the driving state of a driver of the motor vehicle comprising the steps of:

detecting a running speed, an engine rotation number, and a braking of a motor vehicle;

outputting a running speed signal, an engine rotation number signal, and a braking signal representative of the detected running speed, engine rotation number, and braking of the motor vehicle, respectively; and displaying simultaneously graphical representations of the running speed signal, the engine rotation number signal, and the braking signal to provide a visual representation of a driving history of a driver of the motor vehicle over a certain period of time.

19. A motor vehicle driving analytically diagnosing method for analyzing the driving state of a driver of the motor vehicle comprising the steps of:

detecting a running speed, an engine rotation number, and a braking of a motor vehicle;

outputting a running speed signal, an engine rotation number signal, and a braking signal representative of the detected running speed, engine rotation number, and braking of the motor vehicle, respectively;

generating a differentiated running speed signal from the running speed signal;

generating a driving roughness signal from the running speed signal and the engine rotation number signal;

generating a braking urgency signal from the running speed signal and engine rotation number signal; and displaying simultaneously graphical representations of the differentiated running speed signal, the driving roughness signal, and the braking urgency signal to provide a visual representation of a driving history of a driver of the motor vehicle over a certain period of time.

20. A motor vehicle driving analytically diagnosing method for analyzing the driving state of a driver of the motor vehicle comprising the steps of:

detecting a running speed, an engine rotation number, and a braking of a motor vehicle;

outputting a running speed signal, an engine rotation number signal, and a braking signal representative of the detected running speed, engine rotation number, and braking of the motor vehicle, respectively;

generating a differentiated running speed signal from the running speed signal;

generating a driving roughness signal from the running speed signal and the engine rotation number signal;

generating a braking urgency signal from the running speed signal and engine rotation number signal; and displaying simultaneously graphical representations of the running speed signal, the engine speed signal, the braking signal, The differentiated running speed signal, the driving roughness signal, and the braking urgency signal to provide a visual representation of a driving history of a driver the motor vehicle over a certain period of time.

21. A motor vehicle driving analytically diagnosing apparatus for analyzing the driving state of a driver the motor vehicle comprising:

means for detecting a running speed, an engine rotation number, and a braking of a motor vehicle;

means for outputting a running speed signal, an engine rotation number signal, and a braking signal representative of the detected running speed, engine rotation number, and braking of the motor vehicle, respectively;

means for generating analyzed signals indicative of a driving state of a driver from the running speed signal, the engine rotation number signal, and the braking signal;

means for counting dangerous driving times during which the analyzed signals satisfy predetermined danger judging conditions;

means for evaluating the dangerous driving times with respect to respective evaluation thresholds to produce evaluation signals; and means for combining the evaluation signals to produce at least one signal representing an evaluation of the driving history of the driver in a certain period of time.

22. A motor vehicle driving analytically diagnosing apparatus for analyzing the driving state of a driver of the motor vehicle comprising:

means for detecting a running speed, an engine rotation number, and a braking of a motor vehicle;

means for outputting a running speed signal, an engine rotation number signal, and a braking signal representative of the detected running speed, engine rotation number, and braking of the motor vehicle, respectively; and means for displaying simultaneously graphical representations of the running speed signal, the engine rotation number signal, and the braking signal to provide a visual representation of a driving history of a driver of the motor vehicle over a certain period of time.

23. A motor vehicle driving analytically diagnosing apparatus for analyzing the driving state of a driver of the motor vehicle comprising:

means for detecting a running speed, an engine rotation number, and a braking of a motor vehicle;

means for outputting a running speed signal, an engine rotation number signal, and a braking signal representative of the detected running speed, engine rotation number, and braking of the motor vehicle, respectively;

means for generating a differentiated running speed signal from the running speed signal;

means for generating a driving roughness signal from the running speed signal and the engine rotation number signal;

means for generating a braking urgency signal from the running speed signal and engine rotation number signal; and means for displaying simultaneously graphical representations of the differentiated running speed signal, the driving roughness signal, and the braking urgency signal to provide a visual representation of a driving history of a driver of the motor vehicle over a certain period of time.

24. A motor vehicle driving analytically diagnosing apparatus for analyzing the driving state of a driver of the motor vehicle comprising:

means for detecting a running speed, an engine rotation number, and a braking of a motor vehicle;

means for outputting a running speed signal, an engine rotation number signal, and a braking signal representative of the detected running speed, engine rotation number, and braking of the motor vehicle, respectively;

means for generating a differentiated running speed signal from the running speed signal;

means for generating a driving roughness signal from the running speed signal and the engine rotation number signal;

means for generating a braking urgency signal from the running speed signal and engine rotation number signal; and means for displaying simultaneously graphical representations of the running speed signal, the engine speed signal, the braking signal, the differentiated running speed signal, the driving roughness signal, and the braking urgency signal to provide a visual representation of a driving history of a driver of the motor vehicle covers certain period of time.

* * * * *